(12) United States Patent
Scruton et al.

(10) Patent No.: US 7,835,945 B2
(45) Date of Patent: Nov. 16, 2010

(54) MULTIPLE-PLATFORM ESTIMATING AND AUTOMATIC QUOTING FOR NETWORK-BASED PARTS RESALE

(75) Inventors: Jay F. Scruton, Olathe, KS (US); Orson P. Davis, Olathe, KS (US); Deathe Davis, Lawrence, KS (US)

(73) Assignee: P.S. Holdings, LLC, Overland Park, KS (US)

( * ) Notice: Subject to any disclaimer, the term of this patent is extended or adjusted under 35 U.S.C. 154(b) by 1587 days.

(21) Appl. No.: 10/979,777

(22) Filed: Nov. 2, 2004

(65) Prior Publication Data

US 2005/0144095 A1 Jun. 30, 2005

Related U.S. Application Data

(60) Provisional application No. 60/546,122, filed on Feb. 19, 2004, provisional application No. 60/519,456, filed on Nov. 10, 2003, provisional application No. 60/516,696, filed on Nov. 3, 2003.

(51) Int. Cl.
  *G06Q 30/00* (2006.01)
(52) U.S. Cl. ...................................... 705/26
(58) Field of Classification Search .................. 705/26, 705/27
See application file for complete search history.

(56) References Cited

U.S. PATENT DOCUMENTS 5,758,328 A   5/1998   Giovannoli
5,842,178 A   11/1998  Giovannoli
6,014,644 A   1/2000   Erickson
6,356,909 B1  3/2002   Spencer
6,487,479 B1  11/2002  Nelson
6,671,818 B1  12/2003  Mikurak
2002/0007324 A1  1/2002  Centner et al.
2002/0052862 A1  5/2002  Scott et al.
2002/0059132 A1  5/2002  Quay et al.
2003/0149578 A1  8/2003  Wong

OTHER PUBLICATIONS

Notification Concerning Transmittal of International Preliminary Report on Patentability from PCT Application No. PCT/US2004/036449, mailed May 18, 2006, (5 pages).

*Primary Examiner*—Mila Airapetian
(74) *Attorney, Agent, or Firm*—Shumaker & Sieffert, P.A.

(57) ABSTRACT

A part location system is described that utilizes computer-based techniques for bringing together repair facilities and suppliers to increase the efficiency of locating recycled, used or aftermarket parts using a computer network, such as the Internet. The part location system receives an electronic estimate from one of the repair facilities, parses the estimate to extract pertinent information regarding parts needed in the repair process, and automatically generates an RFQ using the pertinent information extracted from the estimate. The part location system communicates the RFQ to a number of suppliers. The part location system electronically receives quotes from the suppliers and presents the quotes to the repair facility, which determines whether to accept any of the quotes. The part location system maintains an audit log, which may be used to track the effort used to obtain recycled or aftermarket products.

98 Claims, 22 Drawing Sheets

FIG. 8 — EMS Extract Profile (120)

- My Computer
  - C
    - ATI
    - ce95
    - CIECA
    - CSFX
    - C_DILLA
    - DELL
    - Documents and Settings
    - DRIVERS
    - I386
    - MITCHELL
    - My Downloads
    - Pathways
    - Program Files
    - RECYCLER
    - SLWIN
    - SLWTEMP
    - System Volume Information
    - TEMP
    - UT
    - WINDOWS

| Field | Path | |
|---|---|---|
| ADP EMS | U:\EMS_testingADP\ | Set |
| Comp Est EMS | U:\EMS_testingCOMPest\ | Set |
| Mitchell EMS | U:\EMS_testingMitchell\ | Set |
| CCC EMS | U:\EMS_testingPathways\ | Set |

FIG. 9 — RFQ Submit – Automobile (130)

Claim Information EDIT (132)
- Claim #: 4648820001
- Insurance Co: Freedom Mutual
- Auto Owner: FLORENCE WALKLET
- RO #:
- Date of Loss:
- Owner Status: Insured

Vehicle Information EDIT (134)
- VIN: 1C4GK54R5PX744600
- Make: Chrysler
- Fuel Type: Gas
- Transmission Type:
- Odometer:
- Year: 1993
- Model: Town & Country
- Engine: V6, 3.3L
- Axle Type: 4WD

Part(s) Information EDIT/ADD (136)
- Part: Bumper Assembly, Front — Side: Not Specified
- Part: Headlamp Assembly — Side: Driver
- Part: Fender — Side: Driver

Contact/Shipping Information (138)
- First Name: Bob
- Company/Contact: Bob's Body Shop
- Address: 125 1st Street
- City: Lenexa
- Zip/Postal Code: 66023
- Daytime Phone: 913-599-1600
- Work Phone:
- Email: bsc@ps.com
- Last Name: Jackson
- Your Business:
- Address 2:
- State: Kansas
- Country: United States
- Fax:
- Mobile:
- Notification: E-mail notification is not in process

Processing Information (139)
- Recycled Mark-Up: 15%
- Rules: No Rules
- Customer Status: Drop Off Please click submit only once.

APU solutions
REAL STEEL | REAL TIME

Date: 10/21/2004 12:15PM

Vehicle Information
Vehicle: 1993 Chrysler Town & Country
VIN: 1C4GK54R5PX744600

Insurance Information
Claim Number: 4648820001
Insurance Company: Freedom Mutual Please note: Shipping charges may apply to any parts shipped over 75 miles.
All distances are approximate.

| Part | Description | Quote/Stock Number | Quote Price | Quote w/ Markup | Shipping | Total |
|---|---|---|---|---|---|---|
| Bumper Assembly, Front | FRONT BUMPER 2: LKQ BUMPER ASSY | 3P0323HLN | $150.00 | $165.00 | $0.00 | $165.00 |

Airport Auto Parts (HL)
Contact: Hotlines Hotlines
56 Crawford Street
Leominster, Massachusetts 01453
9785343137
jack@airportautoparts.com
Distance: 33 miles To ensure you receive this special pricing, please mention that this is a Hotlines/APU quote to the supplier.
*HOTLINES NETWORK*
*The TOP Recyclers in the Nation*

| Part | Description | Quote/Stock Number | Quote Price | Quote w/ Markup | Shipping | Total |
|---|---|---|---|---|---|---|
| Headlamp Assembly | FRONT LAMPS 11: LENS & HOUSING VOYAGER & T&C | Z145HLN | $40.00 | $44.00 | $0.00 | $44.00 |

Toytown Auto Salvage (HL)
Contact: Hotlines Hotlines
800 Spring Street
Winchendon, Massachusetts 01475
9782970350
service@toytownauto.com
Distance: 34 miles To ensure you receive this special pricing, please mention that this is a Hotlines/APU quote to the supplier.
*HOTLINES NETWORK*
*The TOP Recyclers in the Nation*

| Part | Description | Quote/Stock Number | Quote Price | Quote w/ Markup | Shipping | Total |
|---|---|---|---|---|---|---|
| Fender | FENDER 20: FENDER | 00041654HLN | $40.00 | $44.00 | $0.00 | $44.00 |

Bills Auto Parts (HL)
Contact: Paul Jim Ron and Scott Hotlines
70 Macondry Street
Cumberland, Rhode Island 02864
4017251225
need
Distance: 75 miles To ensure you receive this special pricing, please mention that this is a Hotlines/APU quote to the supplier.
*HOTLINES NETWORK*
*The TOP Recyclers in the Nation*

View as PDF

| Quote-Information | | | |
|---|---|---|---|
| Part: | Grille | Side: | |
| Part Price: | $10.00 | Clean/Repair: | 0 |
| S&H: | $0.00 | Miles on Part: | 0 |
| Quote Number | | | |
| Comments: | | | Return: ☐ |
| | Total: $10.00 | Purchase Date: 02/08 09:37AM | |

[Submit]

Parts Information

| Part | Quotes Received | Purchased Price | Price on Estimate | Difference | Status | Suppliers w/o Part | Comments |
|---|---|---|---|---|---|---|---|
| Bumper Assembly (Front) | 4 | $216.00 | $261.92 | $45.92 | Purchase | 1 | |
| Grille | 2 | $36.00 | $55.14 | $19.14 | Purchase | 3 | |
| Headlamp Assembly | 4 | $180.00 | $243.89 | $63.89 | Purchase | 1 | |
| Hood | 4 | $264.00 | $331.79 | $67.79 | Purchase | 1 | |
| Fender | 4 | $0.00 | | | Declined | 1 | Quote(s) too high, purchased OEM |
| Wheel | 4 | $0.00 | | | Returned | 1 | |
| Windshield Glass | 1 | $276.00 | $432.73 | $156.73 | Purchase | 2 | |
| 3/4 Front Section | 1 | $0.00 | | | Declined | 2 | Close RFQ on estimator's behalf |
| Header Panel Assembly | 0 | $0.00 | | | Declined | 3 | No quotes available, purchased OEM |
| | Total: | $972.00 | Difference: | $353.47 | | | |

Claim Activity

Reporting for Employee Training

Activity:        [Repair Facility Activity ▼]
Report Type:     [Repairable Claims Report ▼]

Search Criteria

| Region: | Employee Regional | | |
|---|---|---|---|
| Local: | Body Shop C | User: | [Any ▼] |
| Start Activity Date: | Choose Date | Claim #: | |
| End Activity Date: | Choose Date | RO #: | |
| Vehicle Start Year: | [Any ▼] and newer | Insurance Company: | [Any ▼] |
| Vehicle End Year: | [Any ▼] and older | Country: | [Any ▼] |
| | | State: | [Any ▼] |

[Clear] [Submit]

| Claims submitted | Parts requested | Total Quotes | Parts with Quotes | Number of purchases | Purchase Rate | Total purchases |
|---|---|---|---|---|---|---|
| 128 | 889 | 1152 | 250 | 10 | 4% | $13,003.00 |

| Seller Claim List | | | | | | |
|---|---|---|---|---|---|---|
| Claim# | RO# | Year/Make/Model | Date/Time | Shop Name | View Estimate | Close Estimate |
| 1766506040-01 ! | | 1999 Chevrolet Blazer | 09/11 11:15AM | Body Shop A | | Close Claim |
| msqtest1 | ! | 2000 Dodge Intrepid | 09/11 01:06PM | Body Shop A | | Close Claim |

! This symbol indicates that the client is waiting for estimate to be completed. Please quote back immediately.

Items 1 to 2 of 2

FIG. 19

Claim Quoting
Claim#: 1766506040-01          RO#:                    Year/Make/Model: 1999 Chevrolet Blazer      View Estimate:
Body Type: Not Specified       Body Style: 2 Door Wagon   Transmission Type: Not Specified
Shipping Location: Lenexa, Kansas 66063                   Send Message

| Part | Quote | Clean/Repair | Shipping | Photo | Comments |
|---|---|---|---|---|---|
| Bumper Assembly (Front) | $0.00 | 0hr/0hr | $0.00 | Browse... | |
| Grille | $0.00 | 0hr/0hr | $0.00 | Browse... | |
| Headlamp Assembly Passenger | $0.00 | 0hr/0hr | $0.00 | Browse... | |
| Parklamp Passenger | $0.00 | 0hr/0hr | $0.00 | Browse... | |
| Hood | $0.00 | 0hr/0hr | $0.00 | Browse... | |
| Fender Passenger | $0.00 | 0hr/0hr | $0.00 | Browse... | |
| 3/4 Front Section Passenger | $0.00 | 0hr/0hr | $0.00 | Browse... | |
| Header Panel Assembly | $0.00 | 0hr/0hr | $0.00 | Browse... | |

Quote Number: _____                                   Please click submit only once. Submit

FIG. 20

Claim Quoting
Claim#: 1766506040-01          RO#:                    Year/Make/Model: 1999 Chevrolet Blazer      View Estimate:
Body Type: Not Specified       Body Style: 2 Door Wagon   Transmission Type: Not Specified
Shipping Location: Lenexa, Kansas 66063                   Send Message

| Part | Net Price | List Price | CAPA Certified | MOVP Certified | Shipping | Photo | Comments |
|---|---|---|---|---|---|---|---|
| Bumper Assembly (Front) | $0.00 | $ | ☐ | ☐ | $0.00 | Browse... | |
| Grille | $0.00 | $ | ☐ | ☐ | $0.00 | Browse... | |
| Headlamp Assembly Passenger | $0.00 | $ | ☐ | ☐ | $0.00 | Browse... | |
| Parklamp Passenger | $0.00 | $ | ☐ | ☐ | $0.00 | Browse... | |
| Hood | $0.00 | $ | ☐ | ☐ | $0.00 | Browse... | |
| Fender Passenger | $0.00 | $ | ☐ | ☐ | $0.00 | Browse... | |
| 3/4 Front Section Passenger | $0.00 | $ | ☐ | ☐ | $0.00 | Browse... | |
| Header Panel Assembly | $0.00 | $ | ☐ | ☐ | $0.00 | Browse... | |

Quote Number: _____                                   Please click submit only once. Submit

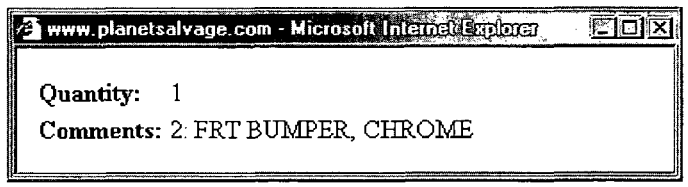

FIG. 21

```
Your Submitted Quotes
        Month                                                                                        Go
        [Sep ▼]
                                      Insurance                     Estimator/
Claim Number    Year:Make:Model       Company        Date            Repair Facility    Purchase Report
4648820001      1993 Chrysler Town & Country   Freedom Mutual   09/17/2004 10:01AM   Bob's Body Shop
6476765477      1999 Honda Civic              Allstate          09/15/2004 4:35PM    Bob's Body Shop
6476765477      1999 Honda Civic              Allstate          09/15/2004 3:03PM    Bob's Body Shop
4648820001      1993 Chrysler Town & Country  Freedom Mutual    09/10/2004 9:08AM    Bob's Body Shop
6476765477      1999 Honda Civic              Allstate          09/08/2004 12:41PM   Bob's Body Shop
6476765477      1999 Honda Civic              Allstate          09/08/2004 12:40PM   Bob's Body Shop
6476765477      1999 Honda Civic              Allstate          09/08/2004 12:31PM   Bob's Body Shop
6476765477      1999 Honda Civic              Allstate          09/08/2004 9:43AM    Bob's Body Shop
6476765477      1999 Honda Civic              Allstate          09/08/2004 9:19AM    Bob's Body Shop
6476765477      1999 Honda Civic              Allstate          09/08/2004 12:06AM   Bob's Body Shop
6476765477      1999 Honda Civic              Allstate          09/07/2004 11:56PM   Bob's Body Shop   Purchase Report
6476765477      1999 Honda Civic              Allstate          09/07/2004 11:54PM   Bob's Body Shop
6476765477      1999 Honda Civic              Allstate          09/07/2004 11:32PM   Bob's Body Shop
6476765477      1999 Honda Civic              Allstate          09/07/2004 11:30PM   Bob's Body Shop
6476765477      1999 Honda Civic              Allstate          09/07/2004 11:25PM   Bob's Body Shop
6476765477      1999 Honda Civic              Allstate          09/07/2004 11:17PM   Bob's Body Shop
1545973859-01   1997 Nissan Maxima            Freedom Mutual    09/04/2004 2:19PM    Bob's Body Shop
4648820001      1993 Chrysler Town & Country  Freedom Mutual    09/02/2004 1:33PM    Bob's Body Shop
1545973859-01   1997 Nissan Maxima            Freedom Mutual    09/01/2004 10:48AM   Bob's Body Shop
                                        Items 1 to 19 of 19
```

FIG. 22

```
Your Pending POs - Requiring Your Action
    Month       Country       State           Make                                              Go
    [Mar ▼]     [Any ▼]       [Any ▼]         [Any              ▼]
PO              RFQ Date              Year    Make        Model       Price
1047476171690   03/12/2003 11:48AM    2000    Chevrolet   Impala      $75.00      Accept
1047476171691   03/12/2003 11:48AM    2000    Chevrolet   Impala      $75.00      Accept
1047476171688   03/12/2003 11:48AM    2000    Chevrolet   Impala      $35.00      Accept
                                Items 1 to 3 of 3
```

| Your Sales | | | | | | | |
|---|---|---|---|---|---|---|---|
| Month | Country | State | Make | | | | Go |
| Mar | Any | Any | Any | | | | |
| PO | RFQ Date | | Year | Make | Model | Price | |
| 1047094080921 | 03/11/2003 03:08PM | | 1997 | Ford | Escort | $200.00 | |
| 1047094079716 | 03/11/2003 12:35PM | | 1992 | Toyota | Celica | $150.00 | |
| 1046992254903 | 03/07/2003 11:52AM | | 2000 | Chevrolet | Cavalier | $225.00 | |
| | | Items 1 to 3 of 3 | | | | | |

| Messages | | | | | | | |
|---|---|---|---|---|---|---|---|
| Subject | Claimnumber | Year/Make/Model | Date Started | Messaging With | Last Message Date | Last Message From | Delete Thread |
| Response times! | 1766506040-01 | 1999 Chevrolet Blazer | 09/11 13:32 PM | Body Shop A | 09/11 13:32 PM | Body Shop A | |
| 99 blazer | 1766506040-01 | 1999 Chevrolet Blazer | 09/11 11:24 AM | Body Shop A | 09/11 11:25 AM | Aftermarket1 | |

| Posts | | | | | | |
|---|---|---|---|---|---|---|
| Subject | Claimnumber | Year/Make/Model | Date Started | Last Message Date | Last Message From | Delete Thread |
| 99 blazer | 1766506040-01 | 1999 Chevrolet Blazer | 09/11 11:24 AM | 09/11 11:25 AM | Aftermarket1 | |

From: Body Shop A   Date Sent: 09/11 11:24 AM

This is an LX sport trac

From: Aftermarket1   Date Sent: 09/11 11:25 AM thanks

Post Reply

[Submit]

| Total Claims | Total Parts | Your Quotes | Returns | Sales Totals | Avg Response Time (in Minutes) |
|---|---|---|---|---|---|
| 200 | 1412 | 136 | 9 | $571.00 | 00:15:41 |

| Year/Make/Model | Request Date | Body Shop | Your Sales |
|---|---|---|---|
| 2000 Dodge Intrepid | 09/11/03 | Body Shop A | 0 |
| 1999 Chevrolet Blazer | 09/11/03 | Body Shop A | 0 |
| 1999 Chevrolet Blazer | 09/09/03 | Body Shop A | 0 |
| 1999 Chevrolet Blazer | 09/09/03 | Body Shop A | 0 |
| 2000 Dodge Intrepid | 09/09/03 | Body Shop A | 0 |
| 2000 Dodge Intrepid | 09/09/03 | Body Shop A | 0 |
| 2000 Dodge Intrepid | 09/09/03 | Body Shop A | 0 |
| 2000 Dodge Intrepid | 09/09/03 | Body Shop A | 0 |

Items 1 to 8 of 200

Edit "ABRA" information

Company hierarchy
ABRA  Edit Company Rules
  Colorado
  Georgia
  Minnesota
  UTAH Add Regional office Company information
Name: * ABRA
Branch Type: * Headquarters City: * Minneapolis
State: * MN
Country: * United States Submit

| User name | First name | Last name | City | State | Country | Roles | Remove |
|---|---|---|---|---|---|---|---|
| tadelman | Tim | Adelman | anywhere | Kansas | United States | ☐ IA ☑ BS ☐ Adm | ☐ |

Submit

Add a user to the company

If you know the username of a person you want to add to the company then use this form:

If you don't know the username of a person then you can search for a person in the database:

Username: [      ]      Add User   Find Users

Roleset:  ☐ Insurance Adjuster
          ☐ Body shop
          ☐ Administrator

Items 1 to 1 of 1

FIG. 38

Edit "Colorado" information

Company hierarchy
ABRA
  Colorado  Edit Company Rules
    Abra_Boulder
    Abra_Denver-635
    Abra_Denver-647
    Abra_Littleton
    Abra_Westminster
    Abra_Wheat Ridge Add Local office Company information
Name: * Colorado
Branch Type: * Regional office City: * Denver
State: * CO
Country: * United States Submit

| User name | First name | Last name | City | State | Country | Roles | Remove |
|---|---|---|---|---|---|---|---|
| dcall1 | David | Call | San Diego | California | United States | ☐ IA ☑ BS ☑ Adm | ☐ |

Submit

| Claim List Fri, Sep 17, 15:21 PM | | | |
|---|---|---|---|
| Estimate Submitted | Claim Number | Responded | Not Responded |
| 09/17/2004 02:37:08 PM | 0096143867  View Preliminary Estimate: | 3 | 3 |
| 09/17/2004 12:19:50 PM | 2487234102-01  View Preliminary Estimate: | 4 | 3 |

| 1988 Mercedes-Benz 300 | | |
|---|---|---|
| Username<br>mawparts/ salvage<br>Dion Solheim<br>null | Company<br>Meridian Auto Wrecking | State<br>Washington<br>800-992-6756 |
| Call 1<br>09/17/2004 03:17:01 PM | Call 2<br>○ | Call Notes<br>agent236: short handed |
| Add Comment: [         ]<br>[Submit] | | |
| Username<br>tonkin/ seahawks<br>Kathi Karjala<br>null | Company<br>Tonkin Parts Center | State<br>Oregon<br>503-546-6724 |
| Call 1<br>○ | Call 2<br>○ | Call Notes |
| Add Comment: [         ]<br>[Submit] | | |

FIG. 43

MULTIPLE-PLATFORM ESTIMATING AND AUTOMATIC QUOTING FOR NETWORK-BASED PARTS RESALE

This application claims the benefit of U.S. Provisional Application No. 60/516,696, filed Nov. 3, 2003, U.S. Provisional Application No. 60/519,456, filed Nov. 10, 2003, and U.S. Provisional Application No. 60/546,122, filed Feb. 19, 2004, the entire contents of each are incorporated herein by reference.

TECHNICAL FIELD

The invention relates to network-systems for the sale of recycled, used or replacement parts for repair of systems and products.

BACKGROUND

The Internet has provided buyers and suppliers with new opportunities to connect with each other to buy and sell products. Many systems for connecting these buyers and suppliers have been developed that provide computerized mechanisms to solicit quotes for items and request offers from suppliers to assist in sales process. While these systems provide a mechanism for the sale of goods from suppliers to buyers, these systems are typically general in nature, i.e., these systems offer goods of any type that may be, at most, organized into different categories of goods being offered for sale. These systems provide sales methods of varying types that may include auctions, request for proposals, offers to purchase or other types of sales transactions.

SUMMARY

In general, the invention is directed to techniques for bringing together repair facilities and suppliers to increase the efficiency of locating recycled, used or aftermarket parts using a computer network, such as the Internet. The automobile industry is one such industry that frequently uses recycled, used and replacement parts for repair.

As will be described in further detail below, a part location system receives an estimate from one of the repair facilities. The repair facility may remotely log into the part location system using a web browser and send the estimate to part location system via the Internet. The estimate may be, for example, an estimate provided to an owner of an automobile that is in the repair facility for repair.

The part location system parses the estimate to extract pertinent information regarding parts needed in the repair process and automatically generates an RFQ using the pertinent information extracted from the estimate. The information extracted from the estimate may include make/model/year of the automobile as well as a list of parts that are needed for the repair. The part location system may further filter the extracted information such that no private information about the vehicle owner is included in the RFQ.

The part location system selects one or more suppliers to send the RFQ, and electronically sends the RFQ to the selected suppliers. In one embodiment, the part location system selects the one or more of suppliers based on a database of stored profiles for the requesting repair facility. For example, based on the database, the part location system identifies specific suppliers with which the requesting repair facility is willing to conduct business. In this manner, the repair facilities may select their own suppliers to create a virtual marketplace of suppliers with whom they wish to do business.

The part location system receives quotes for one or more parts identified in the RFQ from one or more of suppliers that received the RFQ. The part location system presents the quotes to the repair facility associated with the RFQ, i.e., the repair facility that sent the RFQ. The repair facility examines the quotes received from the suppliers and determines whether to accept any of the quotes. Upon accepting one of the quotes, the part location system automatically generates a purchase order for the identified part and sends the purchase order to the corresponding supplier that submitted the quote.

The part location system maintains an audit log that includes each generated RFQ as well as the resulting quotes received for each RFQ. Additionally, the part location system further maintains an electronic record of the parts purchased by the repair facility, i.e., the quotes accepted by the repair facility, in the audit log. The repair facility or an auditor, such as an insurance company, may electronically access the audit log to track the effort used to obtain recycled or aftermarket products. In this manner, the part location system may be used as an auditing tool to make sure that repair facilities make a legitimate effort to find recycled, used or aftermarket parts when appropriate.

In one embodiment, the invention provides a method comprising receiving an estimate from a repair facility over a communication network, parsing the estimate to extract information that identifies a list of parts needed by the repair facility, automatically generating a request for quote (RFQ) using the information extracted from the estimate and sending the RFQ to suppliers via the communication network.

In another embodiment, the invention provides a device comprising a communication interface to couple the device to a computer network and a control unit. The control unit comprises a parsing engine that receives an estimate from a remote repair facility over the computer network and parses the estimate to extract information that identifies a list of parts needed by the remote repair facility. The control unit further includes a request for quote (RFQ) manager that automatically generating an RFQ using the information extracted from the estimate and sends the RFQ to suppliers via the computer network.

In a further embodiment, the invention provides a system comprising a repair facility coupled to a computer network, a plurality of suppliers coupled to the computer network, and a part location device coupled to the computer network. The part location device comprises a control unit that include a parsing engine that receives an estimate from a remote repair facility over the computer network and parses the estimate to extract information that identifies a list of parts needed by the remote repair facility, and a request for quote (RFQ) manager that automatically generating an RFQ using the information extracted from the estimate and sends the RFQ to suppliers via the computer network.

In another embodiment, the invention provides a computer-readable medium comprising instructions that cause a programmable processor to receive an estimate from a repair facility over a communication network, parse the estimate to extract information that identifies a list of parts needed by the repair facility, automatically generate a request for quote (RFQ) using the information extracted from the estimate, and send the RFQ to suppliers via the communication network.

In yet another embodiment, the invention provides a method comprising maintaining an audit log that tracks RFQs generated for one or more repair facilities, quotes received from suppliers for each of the RFQs, and the quotes accepted and declined by the repair facilities. The method further includes presenting at least a portion of the audit log to an auditor.

In a further embodiment, the invention provides a method comprising receiving an estimate from a repair facility, parsing the estimate to extract information that identifies a list of parts needed by the repair facility, filtering at least a portion of the parts that do not meet a set of rules provided by an insurance company, and automatically generating a request for quote (RFQ) using the information extracted from the estimate.

In another embodiment the invention provide a method comprising receiving an estimate from a repair facility, parsing the estimate to extract information that identifies a list of parts needed by the repair facility, identifying combinations of parts from the list of parts that form an aggregate part and automatically generating a request for quote (RFQ) using the information extracted from the estimate and the identified aggregate parts.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 6 is a screen illustration of an exemplary user interface for submitting an estimate to system or viewing other account activity.

FIG. 7 is a screen illustration of an exemplary user interface for downloading an Active X controller for the EMS Estimate submittal option.

FIG. 8 is a screen illustration of an exemplary user interface presented to the user associated with a repair facility after downloading the Active X controller, but before using the EMS Estimate option.

FIG. 9 is a screen illustration of an exemplary user interface for reviewing an RFQ generated by part location system.

FIG. 10 is a screen illustration of an exemplary user interface for editing parts information in the RFQ.

FIG. 11 is a screen illustration of an exemplary user interface for viewing open RFQs.

FIG. 13 is a screen illustration of an exemplary user interface 165 for recommending available alternative parts to the repair facility by doing a quick zip code search.

FIG. 15 is a screen illustration of an exemplary user interface for returning a part to a supplier.

FIG. 16 is a screen illustration of an exemplary user interface that compiles all data regarding a claim and alternative parts requests.

FIG. 17 is a screen illustration of an exemplary user interface for reporting of use of part location system for finding recycled, used or aftermarket parts.

FIG. 18 is a screen illustration of an exemplary user interface for suppliers to view RFQs received from repair facilities.

FIGS. 19 and 20 are a screen illustration of exemplary user interfaces for suppliers to provide quotes to part location system.

FIG. 21 is a screen illustration of an exemplary user interface for allowing direct communication between the repair facility and the supplier.

FIG. 22 is a screen illustration of an exemplary user interface for presenting a supplier with all currently outstanding quotes.

FIG. 23 is a screen illustration of an exemplary user interface for viewing pending purchase orders.

FIG. 26 is a screen illustration of an exemplary user interface for viewing sales the supplier has completed.

FIG. 27 is a screen illustration of an exemplary user interface for viewing messages that the supplier has declined.

FIG. 28 is a screen illustration of an exemplary user interface for viewing messages that the supplier sent or received in further detail.

FIG. 29 is a screen illustration of an exemplary user interface for reporting use of part location system.

FIG. 30 is a screen illustration of an exemplary user interface for setting a profile.

FIGS. 32-43 are screen illustrations of exemplary user interfaces for administrative functions.

DETAILED DESCRIPTION

Figure 1:
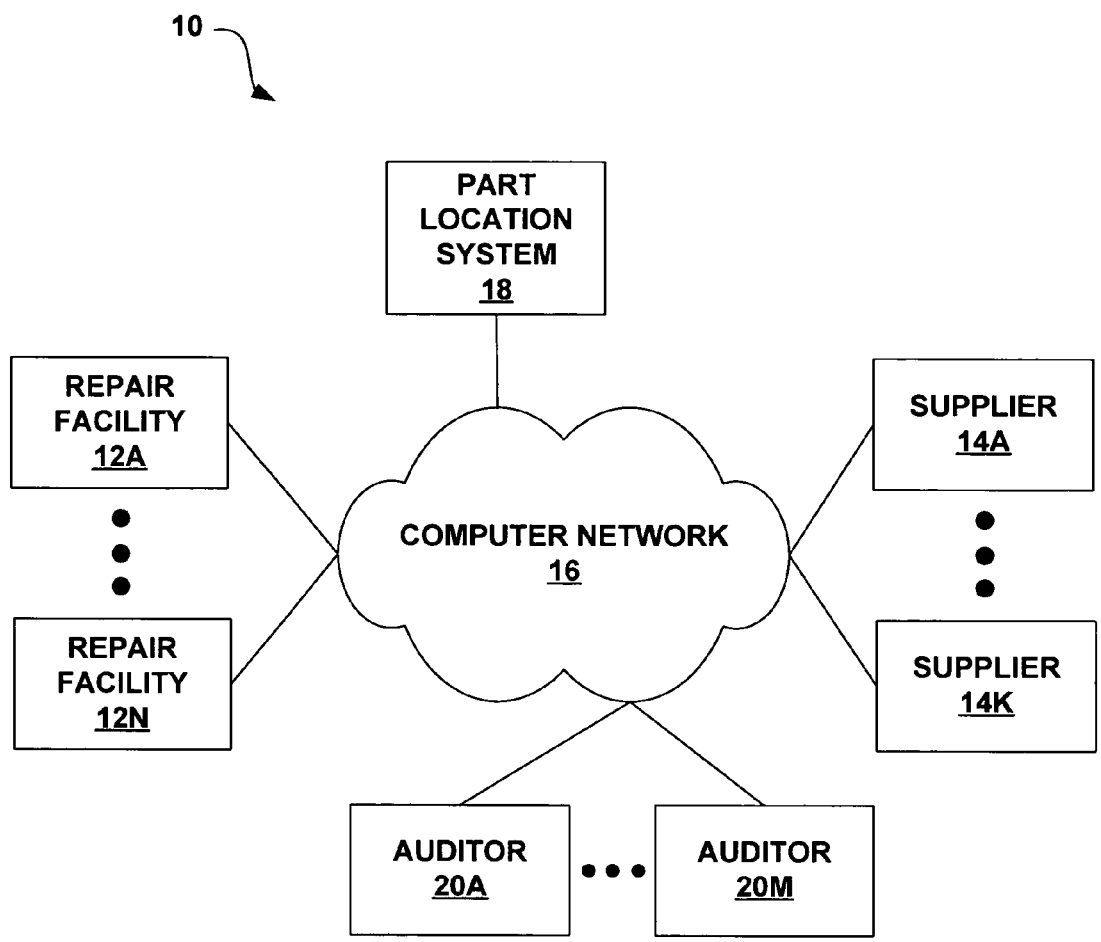
FIG. 1 is a block diagram illustrating an exemplary on-line sales system for buying and selling of recycled, used and aftermarket parts for repair of systems and products.

FIG. 1 is a block diagram illustrating an exemplary on-line sales system 10 for buying and selling of recycled, used and aftermarket parts for repair of systems and products. One such industry that frequently uses recycled, used and replacement parts for repair is the automobile industry. Although the techniques of the invention are described herein in terms of the automobile industry for exemplary purposes, the techniques of the invention may be applied to other repair industries in which it may be beneficial to use recycled, used or aftermarket parts in the repair of systems or products. For example, the techniques of the invention may be applied to the boat or airplane repair industry.

In general, the invention is directed to techniques for bringing together repair facilities 12A-12N ("repair facilities 12") and suppliers 14A-14K ("suppliers 14") to increase the efficiency of locating recycled, used or aftermarket parts using a computer network 16, such as the Internet. As illustrated in FIG. 1, repair facilities 12, suppliers 14 and a part location system 18 are coupled to a common computer network 16. Repair facilities 12 and suppliers 14 communicate information regarding recycled, used and aftermarket parts to one another via computer network 16 and part location system 18. Part location system 18 may, for example, comprise one or more centrally located servers, and is accessible to repair facilities 12 and suppliers 14 via computer network 16 using a standard web-browser or other communication interface.

In addition, auditors 20A-20M ("auditors 20") may couple to common computer network 16 to communicate with part location system 18. Auditors 20 may, for example, be insurance companies, and may utilize part location system 18 to monitor repair facilities 12 to ensure that repair facilities 12 are making an "honest" effort to find recycled, used and aftermarket parts when appropriate.

Computer network 16 may include one or more Local Area Networks (LANs), Wide Area Network (WANs), Wireless LANs or the like. Computer network 16 may also include one or more connected network devices (not shown), such as personal computers, laptop computers, handheld computers, workstations, servers, routers, switches, printers, fax machines, or the like. Repair facilities 12 may include auto repair shops from around the nation, or even around the world. Suppliers 14 may include recyclers, used part dealers, aftermarket vendors or any combination thereof. Suppliers 14 may also be located anywhere throughout the nation or the world.

As will be described in further detail below, part location system 18 electronically publishes requests for quotes (RFQs), also referred to as request for proposals (RFPs), for repair facilities 12, and sends the RFQs to one or more of suppliers 14 to obtain a quote for one or more items on the RFQ. In particular, part location system 18 receives an estimate from one of repair facilities 12, e.g., repair facility 12A. The estimate may, for example, be an estimate provided to an owner of an automobile that is in repair facility 12A for repair.

Part location system 18 parses the estimate to extract pertinent information, such as the parts needed in the repair process, and automatically generates an RFQ using the pertinent information extracted from the estimate. Part location system 18 selects one or more of suppliers 14 and sends the RFQ to the selected suppliers 14. In one embodiment, part location system 18 selects the one or more of suppliers 14 based on a stored profile of repair facility 12A. For example, part location system 18 may store a profile that identifies specific suppliers 14 with which repair facility 12A is willing to conduct business. Thus, part location system 18 will only send the RFQ to those particular suppliers 14 with which repair facility 12A will conduct business. In this manner, repair facilities 12 may select their own suppliers to create a virtual marketplace of suppliers with whom they wish to conduct business.

Part location system 18 receives quotes for one or more parts identified in the RFQ from one or more of suppliers 14 that received the RFQ. Part location system 18 presents the quotes to the repair facility associated with the RFQ, repair facility 12A in this example. Repair facility 12A examines the quotes received from suppliers 14 and determines whether to accept any of the quotes. Upon accepting one of the quotes, part location system 18 automatically generates a purchase order for the identified part and sends the purchase order to the corresponding supplier that submitted the quote.

Part location system 18 maintains an audit log that tracks generated RFQ as well as the resulting quotes received for each RFQ. Additionally, part location system 18 further maintains a record of the parts purchased by repair facility 12A, i.e., the quotes accepted by repair facility 12A, in the audit log. Repair facility 12A or an auditor 20 may access the audit log to track the effort of repair facility 12A used to obtain recycled or aftermarket products. In this manner, the part location system 18 may be used as an auditing tool to make sure the repair facilities make a legitimate effort to find recycled, used or aftermarket parts when appropriate.

Figure 2:
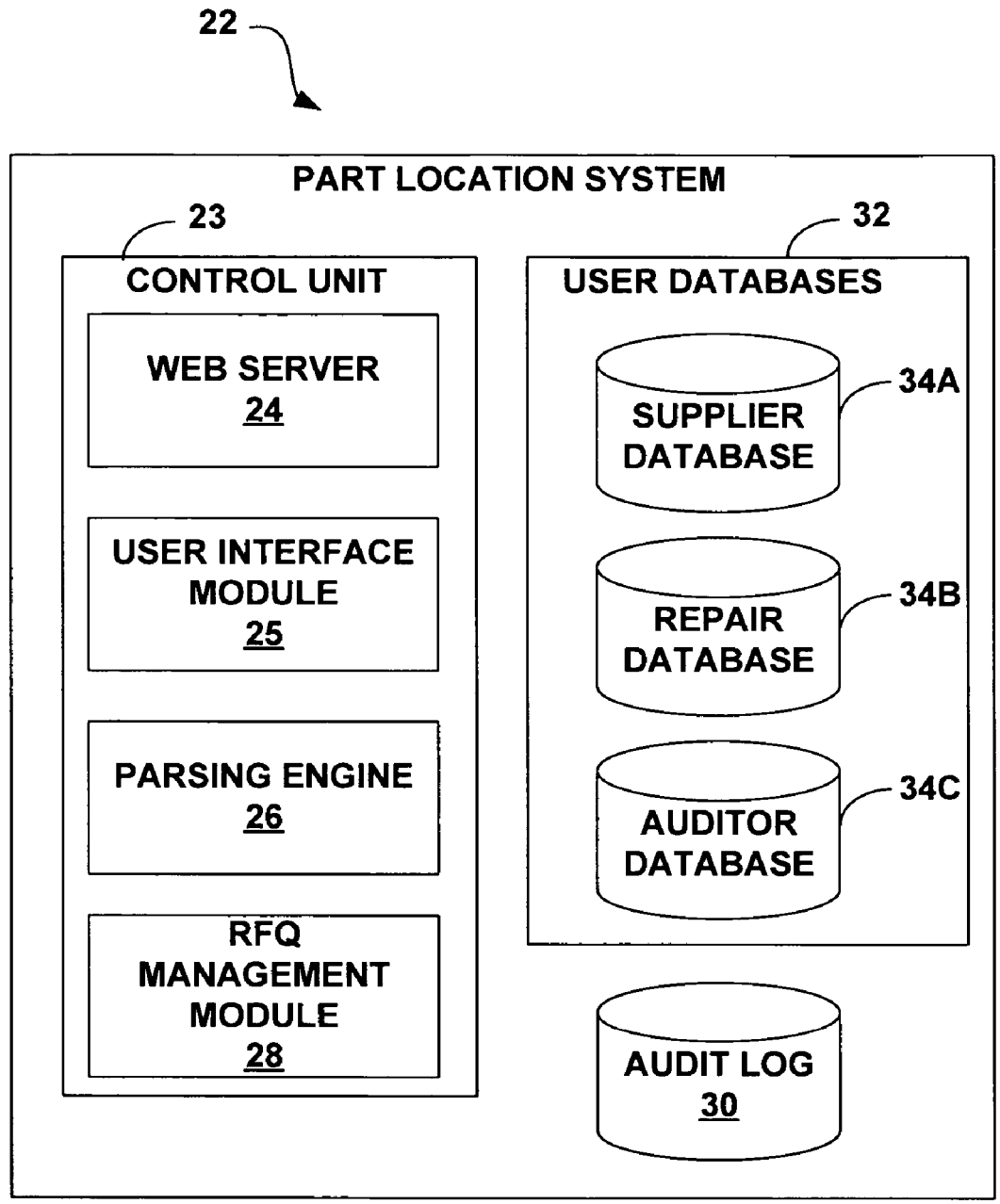
FIG. 2 is a block diagram illustrating an exemplary part location system for increasing the efficiency of an on-line sales system for buying and selling of recycled, used and aftermarket parts for repair of systems and products.

FIG. 2 is a block diagram illustrating an exemplary part location system 22 for increasing the efficiency of an on-line sales system for buying and selling of recycled, used and aftermarket parts for repair of systems and products. Part location system 22 may, for example, represent part location system 18 of FIG. 1.

Part location system 22 comprises a control unit 23 that includes web server 24, a user interface module 25, a parsing engine 26, an RFQ management module 28, and an audit log 30. Part location system 22 also includes user databases 32, which include a supplier database 34A, a repair facility database 34B, and an auditor database 34C. Web server 24 provides a seamless, network-based interface by which a remote user accesses part location system 22. More specifically, web server 24 provides a web-based interface by which the user interacts with part location system 22 via a computer network, such as computer network 16 of FIG. 1. In one configuration, web server 24 executes web server software to provide an environment for interacting with the user via a user interface module 25. Control unit 23 may include one or more computing devices for implementing the various components of the control unit, including web server 24, user interface 25, parsing engine 26 and RFQ management module 28.

User interface module 25 may include Common Gateway Interface (CGI) programs and a graphical user interface (GUI) generator for generating and presenting user interfaces to the user. In various embodiments, the interface presented by part location system 22 may include combinations of "server-side" user interface modules executing on web server 24 and "client-side" user interface modules, such as ActiveX® controls, JavaScripts™, and Java™ Applets, that execute on a computing device located within one of repair facilities 12, suppliers 14 or auditors 20. A user may be an employee associated with one of repair facilities 12, suppliers 14 or auditors 20. For example, an employee may be an estimator, parts manager, parts dealer or the like.

A user, such as an estimator or parts manager, at one of repair facilities 12, e.g., repair facility 12A, may connect to part location system 22 via the computer network using a web browser. User interface module 25 presents the user with a user interface for logging into part location system 22. Part location system 22 receives login data from the user, such as a username and password associated with the repair facility, the user or both, to authenticate the identity of the user or repair facility 12A. The connection through which repair facility 12A connects to part location system 22 may be a secure connection through the network such that all the data sent between part location system 22 and repair facility 12A is encrypted to prevent unauthorized access to the data. In another embodiment, authentication may be performed using a digital certificate or other digital credential.

Once the user at a repair facility is logged into part location system 22, user interface module 25 presents the user with an input screen to allow the user to input an estimate. In addition the estimate input screen provides the user with an option to view previous activity, such as previously generated RFQs. The estimate input screen allows the user to input an estimate in a number of different ways. The user may, for example, copy and paste an estimate from an estimating platform into a window provided by the estimate input screen, electronically attach an estimate, such as an estimate provided to a client by an automobile repair facility, or employ the Estimating Management Standard (EMS) to extract and transfer data from the estimating platform to part location system 22. In some cases, repair facility may request parts without generating an estimate. In such cases, the user at the repair facility may enter a Vehicle Identification Number (VIN) into the estimate input screen and then manually select particular parts that are needed for the repair.

Once repair facility 12A submits the estimate, part location system 22 automatically generates an RFQ. More particularly, parsing engine 26 parses the estimate and extracts the information necessary to automatically generate the RFQ. For instance, parsing engine 26 may extract information such as a make, model, and year of the vehicle or a VIN number, as well as all of the parts requested by repair facility 12A. In addition, parsing engine 26 of the part location system 22 may be configured to intelligently filter particular information. For example, parsing engine 26 may filter information that is protected for privacy reasons, such as name, address, telephone number or other personal information associated with the owner of the vehicle. As another example, parsing engine 26 may filter parts that recyclers typically do not carry or that should be purchased new, e.g., road hazard parts or liability parts, such as brakes. Further, parsing engine 26 may automatically recognize combinations of parts that may form an aggregate part and, instead of or in addition to extracting the separate smaller parts, parsing engine 26 may identify the aggregate part. In certain cases the aggregate part may be cheaper to purchase than the smaller parts listed.

RFQ management module 28 collects all of the pertinent information extracted from parsing engine 26 and automatically generates the RFQ. For example, RFQ management module 28 collects the vehicle information, repair facility information, claim information and all the identified parts, including the aggregate parts that may be substituted for a combination of smaller parts, and generates the RFQ. Part location system 22 may further allow the repair facility to embed an image of one or more of the requested parts in the RFQ.

Part location system 22 then electronically forwards the RFQ to a set of suppliers 14, which may include recyclers, used part dealers and aftermarket vendors, via computer network 16. The set of suppliers 14 to which part location system 22 sends the RFQ may be pre-selected by the requesting repair facility 12A or an insurance company or other auditor 20 associated with repair facility 12A. For example, repair facility 12A may select suppliers 14 within a specific geographic location. Repair facility 12A may, for example, enter a zip code of where the vehicle is to be repaired and perform a 200-mile radius search. As another example, the insurance company associated with the repair facility 12A may select suppliers 14 with which the insurance company frequently does business. Additionally, part location system 12 may maintain a profile of one or more of suppliers 14 to narrow the scope of the RFQs that each of the suppliers 14 obtains. For instance, a supplier that only carries parts for Ford Mustangs may provide part location system 22 with a profile indicating that only RFQs that include parts for Ford Mustangs should be sent.

Part location system 22 may maintain such information in user databases 32. In particular, part location system 22 may maintain a profile of suppliers 14 in supply database 34A, a profile of repair facilities 12 in repair facility database 34B and a profile of auditors 20 in auditor database 34C. Repair database 32B may include information such as username and passwords associated with each repair facility 12, a contact name, address and telephone number associated with the repair facility 12, pre-selected suppliers 14 with which each repair facility 12 is willing to conduct business, the markup used by the repair facility 12, and the like. Supplier database 34A may include a username and password associated with each supplier 14, a particular type of part or parts stocked by the supplier 14, e.g., only Ford Mustang parts, and the like. Auditor database 34C may include username and password associated with each auditor 20, repair facilities used by auditor 20, suppliers 14 with which the auditor is willing to conduct business and the like. Although in the example illustrated in FIG. 2 part location system 22 maintains a separate database for suppliers 14, repair facilities 12 and auditors 20, part location system 22 may maintain a single database that stores information associated with all users of part location system 22.

Suppliers 14 receive the electronic RFQ from part location system 22 and electronically submit quotes on parts requested in the RFQ. Suppliers 14 may submit quotes on all of the parts listed in the RFQ or a portion of the parts, depending on the inventory of recycled or aftermarket parts currently available at the particular supplier. In one embodiment, the quote process is carried out in a "live" fashion. More specifically, an employee of the supplier 14 reviews the received RFQ and enters a quote for one or more of the requested parts. The "live" quote process increases the procurement of recycled parts because the supplier may check the recycled or aftermarket parts inventory before making the quote. For example, conventional recycle quote processes typically access a database of the supplier to determine whether the part is available and the price of the recycled part. However, since the database of the supplier may not always be up to date, the live quote process increases the reliability of the recycled parts quoting process. Suppliers 14 may be required to quote within a certain amount of time in order to preserve the timeliness of obtaining quotes for recycled or aftermarket parts.

In another embodiment, the quote process is automated. In this case, suppliers 14 provide part location system 22 with direct access to the supplier's inventory. Aftermarket suppliers can, for example, provide a "feed" of data from their inventory management system that can be quoted upon to repair facility 12A on their behalf. These feeds can be sent daily or weekly to part location system 22 depending on the accuracy of the inventory. Some suppliers 14 can establish a "live auto-quote" system that allows the request from part location system 22 to directly hit their inventory instantly. This "live auto-quoting" directly from the inventory means that all data is current when the repair facilities receive the price.

Part location system 22 may present repair facility 12A with the quotes or quotes from suppliers 14. More particularly, repair facility 12A may access the part location system 22 and review the quotes from suppliers 14. Part location system 22 may automatically organize the quotes or quotes from suppliers 14 according to part, supplier, or the like. For instance, part location system 22 may organize all of the quotes for a new door panel together and all of the quotes for a new bumper together. Organizing the quotes by part may allow repair facility 12A to view how many quotes for each part was received, along with the price of each quote. Part location system 22 can also organize the parts by supplier to give the repair facility 12A the ability to select suppliers 14 with whom they do the most business.

In addition, part location system 22 may calculate the prices for the purchased parts to include any mark-ups that repair facility 12A charges. Part location system 22 may further post the price of a comparative new part or price as listed on the estimate for comparison with the price of the part.

Repair facility 12A selects one of the quotes for at least a portion of the parts from the RFQ. If, however, no quote is accepted by repair facility 12A for a particular part, repair facility 12A may place a comment next the quote explaining why the quote was not accepted. For instance, if a quote is almost the price of an equivalent new part, repair facility 12A may make a note indicating the quote price was too expensive.

Repair facility 12A can also select "use on estimate" as an alternative to buying the part right away. This selection puts the part on hold with the supplier until such time that repair facility 12A may need to purchase the part. This feature also allows the insurance carrier to be made aware that the price was use on the estimate and savings have occurred more quickly.

Upon receiving input from repair facility 12A identifying quotes that repair facility 12A would like to accept, part location system 22 automatically generates a purchase order for each of suppliers 14 from which repair facility 12A is purchasing parts. If repair facility 12A has selected multiple parts from a particular supplier, part location system 22 will make one purchase order that includes all of the parts from that particular supplier.

As described above, part location system 22 maintains a record of each the parts RFQs generated as well as the resulting quotes received for each of the RFQs. Additionally, part location system 22 maintains in the record the parts purchased by the repair facility. Part location system 22 stores this information in audit log 30. In this manner, part location system 22 may be used as an auditing tool. Part location system 22 may, for example, allow the auditor to search for repair facilities by city, shop name, parts manager, date, time and the like. Further, part location system 22 may allow the auditor to inspect repair facilities and the attempts to obtain recycled parts in a real-time fashion. For instance, an insurance company may use part location system 22 to check whether a repair facility is attempting to find recycled parts for automobiles that are currently being repaired by the repair shop instead of only analyzing repairs that were performed months ago.

Part location system 22 may further provide the auditing entity with summaries of the use of part location system 22. For instance, part location system 22 may provide the auditing entity with a summary that illustrates the number of claims, total number of parts obtained in the claim, the total number of parts purchased, and the total savings. In this manner, insurance companies or other auditing entities may determine whether repair facilities 12 are making a legitimate effort to find recycled, used or aftermarket products.

Figure 3:
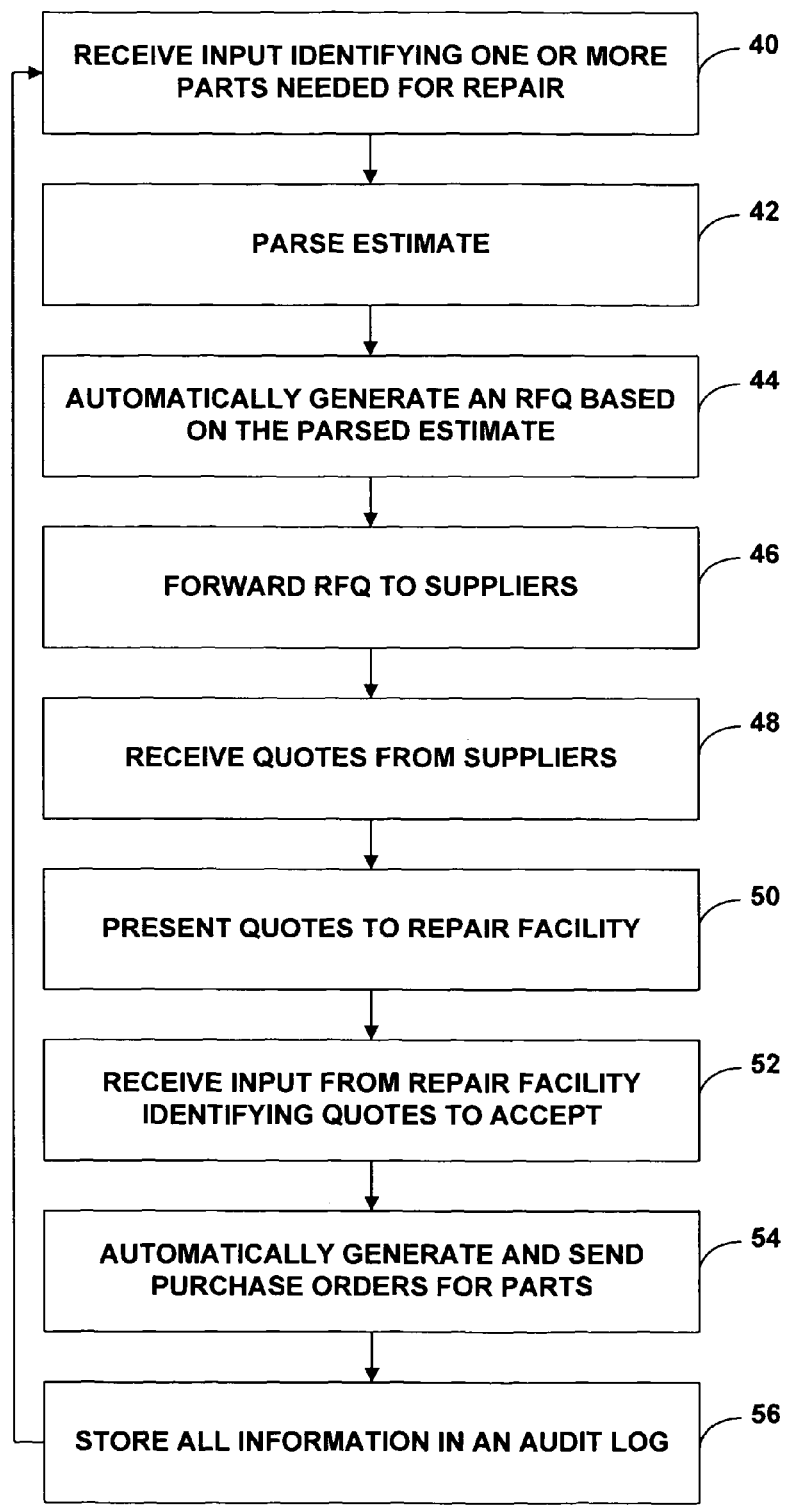
FIG. 3 is a flow diagram illustrating exemplary operation of a part location system in accordance with the invention.

FIG. 3 is a flow diagram illustrating exemplary operation of a part location system, such as part location system 22 of FIG. 2, in accordance with the invention. Initially, a mechanic, parts manager or other user associated with a repair facility 12 logs into part location system 22. The user may, for example, connect to part location system 22 using a web browser, and input a username and password to log into part location system 22.

Part location system 22 receives input identifying one or more parts needed by a repair facility (40). For example, part location system 22 may receive an estimate from the repair facility. As described above, a mechanic or parts manager of the repair facility may copy and paste an estimate from an estimating platform into a window provided by the estimate input screen, electronically attach an estimate created using an estimating platform or employ the Estimating Management Standard (EMS) to extract and transfer data from the estimating platform of repair facility 12 to part location system 22. The attached estimate may be in a format of a standard estimate platform. In the case of automobiles, the standard estimate platform may be one of Certified Collateral Corporation (CCC), Mitchell, or Automatic Data Processing (ADP).

Part location system 22 parses the estimate (42) and automatically generates an RFQ based on the estimate submitted by the repair facility (44). Particularly, part location system 22 parses the estimate to extract pertinent information to automatically generate the RFQ. In addition, part location system 22 may filter out unnecessary or unwanted information, such as private information about the vehicle owner. For example, the parsing engine may extract information such as a make, model, and year of the vehicle, as well as all of the parts specified by the repair facility, while filtering out protected information, such as name, address, telephone number or the like. Part location system 22 may additionally map a part number associated with some or all of the requested parts to a corresponding part number of a supplier.

Further, parts location system 22 may automatically recognize combinations of parts that may form an aggregate part and, part location system 22 may generate the RFQ to list the aggregate part instead of or in addition to listing the separate smaller parts. In addition, part location system 22 may allow the repair facility to embed an image in the RFQ.

Part location system 22 electronically forwards the automatically generated RFQ to one or more suppliers 14 via the computer network (46). As described above, the set of suppliers 14 that receive the RFQ may be selected by the requesting repair facility 12, an insurance company associated with the repair facility 12, or the like.

Part location system 22 electronically receives quotes on one or more of the parts requested in the RFQ from suppliers 14 that receive the RFQ (48). As described above, the quote process may be carried out in a "live" fashion or in an automated fashion using a feed from the supplier's inventory management system.

Part location system 22 presents the repair facility with the quotes from suppliers 14 (50). Part location system 22 may organize the quotes from suppliers 14 according to part, supplier, or the like. In addition, part location system 22 may organize each of the quotes for a particular part according to price, distance, or other variable.

Part location system 22 receives input from the repair facility identifying one or more quotes that the repair facility would like to accept (52). If no quotes are accepted for a particular part, part location system 22 requests the repair facility to indicate the reason for not accepting any of the quotes for the part. Part location system 22 automatically generates and sends a purchase order for the parts associated with the accepted quotes (54). If the repair facility has selected multiple parts from a particular supplier, part location system 22 will make one purchase order that includes all of the parts from that particular supplier.

Part location system 22 maintains an audit log for tracking the use by repair facilities of part location system 22 (56). For example, part location system 22 may maintain a record of each the parts RFQs generated, the resulting quotes received for each of the RFQs, the parts purchased by the repair facility, and the like. Thus, part location system 22 may be used as an auditing tool to determine whether repair facilities 12 are making a legitimate effort to find recycled, used or aftermarket products.

Figure 4:
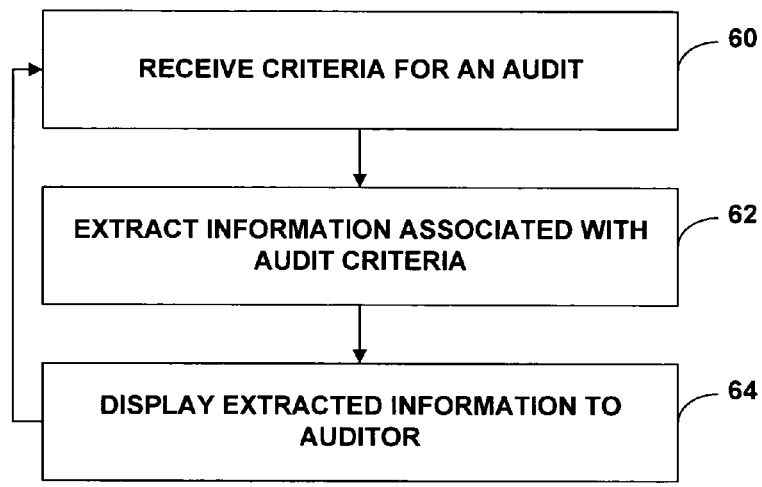
FIG. 4 is a flow diagram illustrating exemplary operation of part location system as an auditing tool.

FIG. 4 is a flow diagram illustrating exemplary operation of part location system 22 as an auditing tool. As described above, part location system 22 tracks the use of the system by repair facilities for auditing purposes. Auditors, such as insurance companies, may want to make sure that the repair facilities are making legitimate efforts to repair vehicles at the lowest cost. Thus, part location system 22 allows auditors to track use of recycled, used and aftermarket products in the repair of the vehicles.

Initially, part location system 22 receives criteria for an audit from an auditor 20 (60). The criteria may, for example, include one or more repair facilities shop names, cities, parts managers, dates, times, or the like. Part location system 22 accesses the audit log to extract information corresponding to the search criteria input by the auditor 20 (62). For example, if the criteria input by the auditor 20 included a repair facility name and a date range, part location system 22 would find all RFQs, resulting quotes, and parts purchased by the identified repair facility during the specified dates. Part location system 22 displays the information retrieved from the audit log to the auditor 20 (64). As described above, the dates and times may be specified such that auditors 20 may track the repair facilities attempt's to find recycled and aftermarket products in real time, i.e., for cars currently being repaired by the repair facility.

In another embodiment, part location system 22 may further provide the auditing entity with periodic summaries of the use of part location system 22 according to criteria specified by the auditor. For instance, part location system 22 may provide the auditing entity with a summary that illustrates the number of claims (also referred to as RFQs), total number of parts obtained in the claim, the total number of parts purchased, and the total savings of particular repair facilities associated with the auditing entity. In this manner, insurance companies or other auditing entities may determine whether repair facilities 12 are making a legitimate effort to find recycled, used or aftermarket products.

Figure 5:
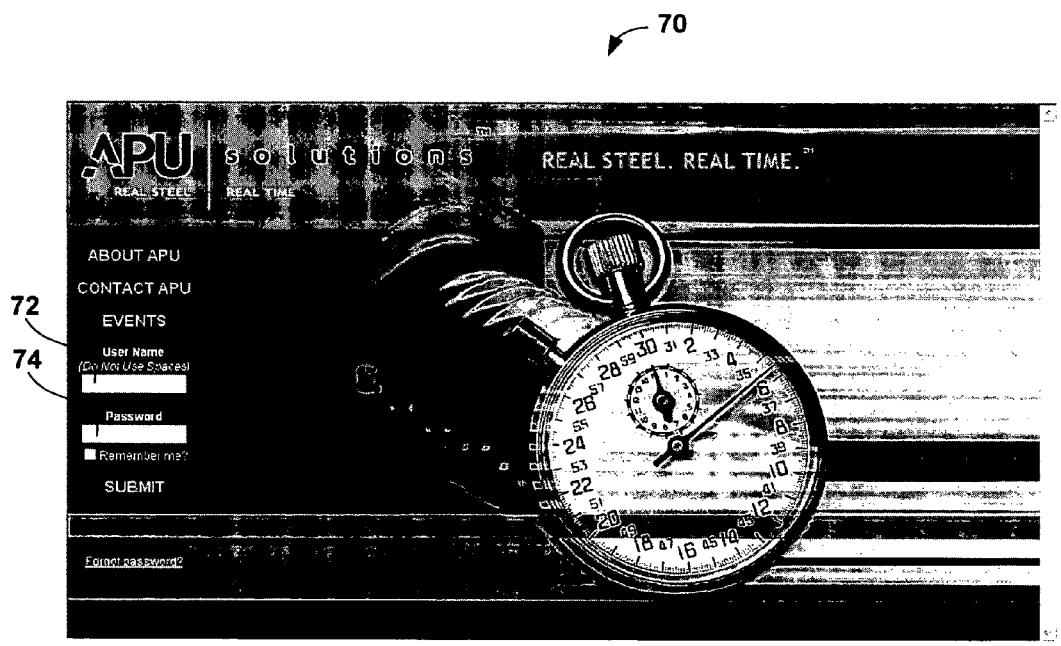
FIG. 5 is a screen illustration of an exemplary user interface for logging into part location system.

FIG. 5 is a screen illustration of an exemplary user interface 70 for logging into part location system 22. In the example illustrated in FIG. 5, user interface 70 presents a login screen that includes a box 72 to enter a username and a box 74 to enter a password. As described above, system 22 may use the username and password entered by the user to identify the repair facility, supplier or auditor logging into part location system 22. Part location system 22 directs the user to a portion of the site that is pertinent to the user's business. For example, if part location system 22 identifies the user as a repair facility, part location system 22 may direct the user to a page for inputting an estimate and generating an RFQ. As another example, part location system 22 may direct the user to a page for reviewing received RFQs and making quotes if the user is identified as a supplier.

In addition, system 22 associates the repair facility 12, supplier 14 or auditor 20 with user specific information maintained in a respective one of user databases 32. For example, part location system 22 may associate the username and password with previously generated RFQs, preferences of suppliers with whom to conduct business, types of parts maintained by the supplier or the like.

Figures 6, 7:
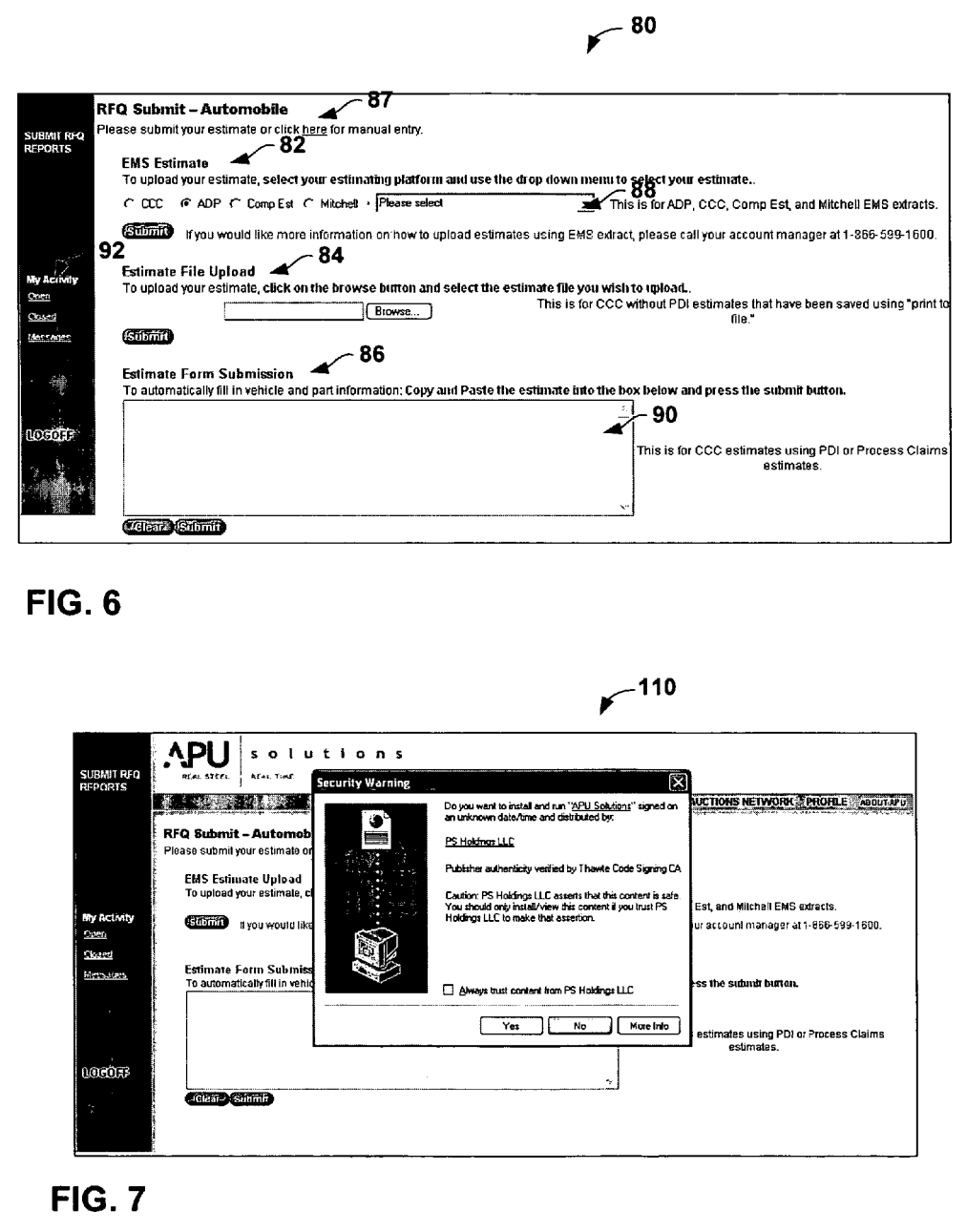

FIG. 6 is a screen illustration of an exemplary user interface 80 for submitting an estimate to system 22 or viewing other account activity. Part location system 22 displays user interface 80 to a user upon associating a name and password with a repair facility. Had the name and password been associated with an auditing entity or a supplier, a different user interface would be presented to the user as described above.

User interface 80 presents the repair facility with a number of different methods for submitting an estimate. As illustrated in FIG. 6, user interface 80 presents the repair facility with three different options for submitting an estimate; and EMS Estimate submittal option 82, an Estimate File Upload option 84, and an Estimate Form Submission option 86.

EMS Estimate submittal option 82 is for submittal of ADP, CCC, Comp Est, and Mitchell EMS extracts. The user selects EMS Estimate submittal option 82 by clicking on the appropriate circle corresponding with the type of EMS extract the user is submitting. In the example illustrated in FIG. 6, the ADP estimate platform is selected. A repair facility may need to download an Active X controller from part location system 22 to facilitate the use of the EMS Estimate extraction.

Once an estimate platform is chosen, part location system 22 populates a drop down menu 88 with claims that have been extracted. In one embodiment, part location system 22 only populates drop down menu 88 with claims that have been extracted within a specified time period, e.g. 24 hours, to prevent overcrowding of the drop down box. The user selects the claim that the user wants to convert to an RFQ and hits "Submit". Part location system 22 then parses the estimate and automatically generates and RFQ corresponding to the estimate.

Estimate File Upload option 84 is used with Mitchell, ADP and CCC without PDI, e.g., estimates that have been saved using "print to file." The user, e.g., parts manager of a repair facility, selects "Browse" button and attaches the estimate from a saved location. The user selects "Submit" button and part location system 22 uploads the specified file for parsing into an RFQ.

Estimate Form Submission option 86 is used with CCC estimates using PDI or Process claims estimates. The user copies the CCC with PDI estimate and pastes it in Estimate Form Submission box 90. The use selects "Submit" button and part location system 22 automatically generates an RFQ based on the information contained in Estimate Form Submission box 90.

Although user interface 80 illustrated in FIG. 6 presents the repair facility with three estimate submitting options, the user interface also present the repair facility with a manual option 87 for identifying needed parts. The user may manually identify needed parts by entering a make/model/year of a car or a VIN number and then specify the particular parts needed. Once the pertinent vehicle data is specified, part location system 22 can create a unique interchange process to determine the correct OEM part associated with the vehicle.

Part location system 22 narrows down each specific part requested to produce the OEM part number(s) and list price (s) associated with each part. Part location system may, for example, do this by mapping the unique vehicle represented by the VIN to a unique vehicle class listed in the OEM database. This allows the generation of a distinct part list from the VIN. This part list is mapped to the parts that are found on the claim allowing us to match OEM parts to parts found on the claim. The database is a consolidated OEM database of multiple manufacturers that allows us to take virtually any vehicle sold in the United States and identify the distinct parts that pertain to that vehicle. We then match them to the non-distinct generic parts listed on the claim.

In addition, user interface 80 includes a "My Activity" sidebar menu 92 that includes links to "Open" activities, "Closed" activities, and "Messages." The "Open" link takes the user to any RFQs that have one or more parts that have not been ordered or closed. In other words, the user may view all RFQs that have been sent to suppliers and either received quotes or are waiting to receive quotes from those suppliers. The "Close" link navigates the user to a user interface that presents the user with RFQs in which all parts have been ordered or closed, i.e., the RFQs are no longer pending. The "Messages" link navigates the user to a user interface that presents the user with any messages received from suppliers.

FIG. 7 is a screen illustration of an exemplary user interface 110 for downloading an Active X controller for the EMS Estimate submittal option. If the user chooses not to download the Active X controller, the user may limit the possibilities for submitting an estimate to Estimate File Upload option 84 and Estimate Form Submission option 86 (See FIG. 6). In other words, without downloading the Active X controller, the repair facility may be unable to use the EMS Estimate option 82.

FIG. 8 is a screen illustration of an exemplary user interface 120 presented to the user associated with a repair facility after downloading the Active X controller, but before using the EMS Estimate option 82. User interface 120 allows the repair facility to set up an upload profile that directs part location system 22 to a location at which the estimates are stored. The repair facility browses through local directories and specifies file paths of EMS files. In the example illustrated in FIG. 8, the file path for all the ADP EMS files is U:\EMS_testinADP\. The repair facility may set the file path for the EMS files for each of the estimate platforms that the repair facility uses. In other words, the repair facility only needs to set a profile for the estimate platforms used by the repair facility. If a repair facility only uses the CCC estimate platform, the repair facility may only set a profile for the CCC EMS and leave the ADP, Comp Est, and Mitchell profiles blank. Once the file paths are determined, the repair facility uploads the settings to part location system 22 by pressing the "Set" button. After the profile is established, part location system 22 populates drop down menu 88 of FIG. 6 with claims from the specified location.

FIG. 9 is a screen illustration of an exemplary user interface 130 for reviewing an RFQ generated by part location system 22. As described in detail above, part location system 22 automatically generates the RFQ using an estimate submitted by a repair facility. User interface 130 presents the repair facility with a preview of the RFQ as generated from the estimate. An estimator or other user from the repair facility should review the RFQ to verify that all information is correct before submitting it.

As illustrated in FIG. 9, user interface 130 divides the information contained in the RFQ into sections, which include a claim information section 132, a vehicle information section 134, a parts information section 136, a contact information section 138, and a processing information section 139. The repair facility may edit any of the information in the RFQ by selecting the Edit/Add button associated with the section within which the information is located. In other words, each section has editable fields that can be accessed by selecting the Edit or Edit/Add links following the titles of each section.

After the claim has been through editing, the repair facility may enter in a mark-up amount as well as customer status. Part location system 22 calculates the mark-up on the quotes that are returned from the suppliers using the specified mark-up. The customer status drop down allows the user to make the suppliers aware of the status of the client requesting their quotes.

Figures 10, 11:
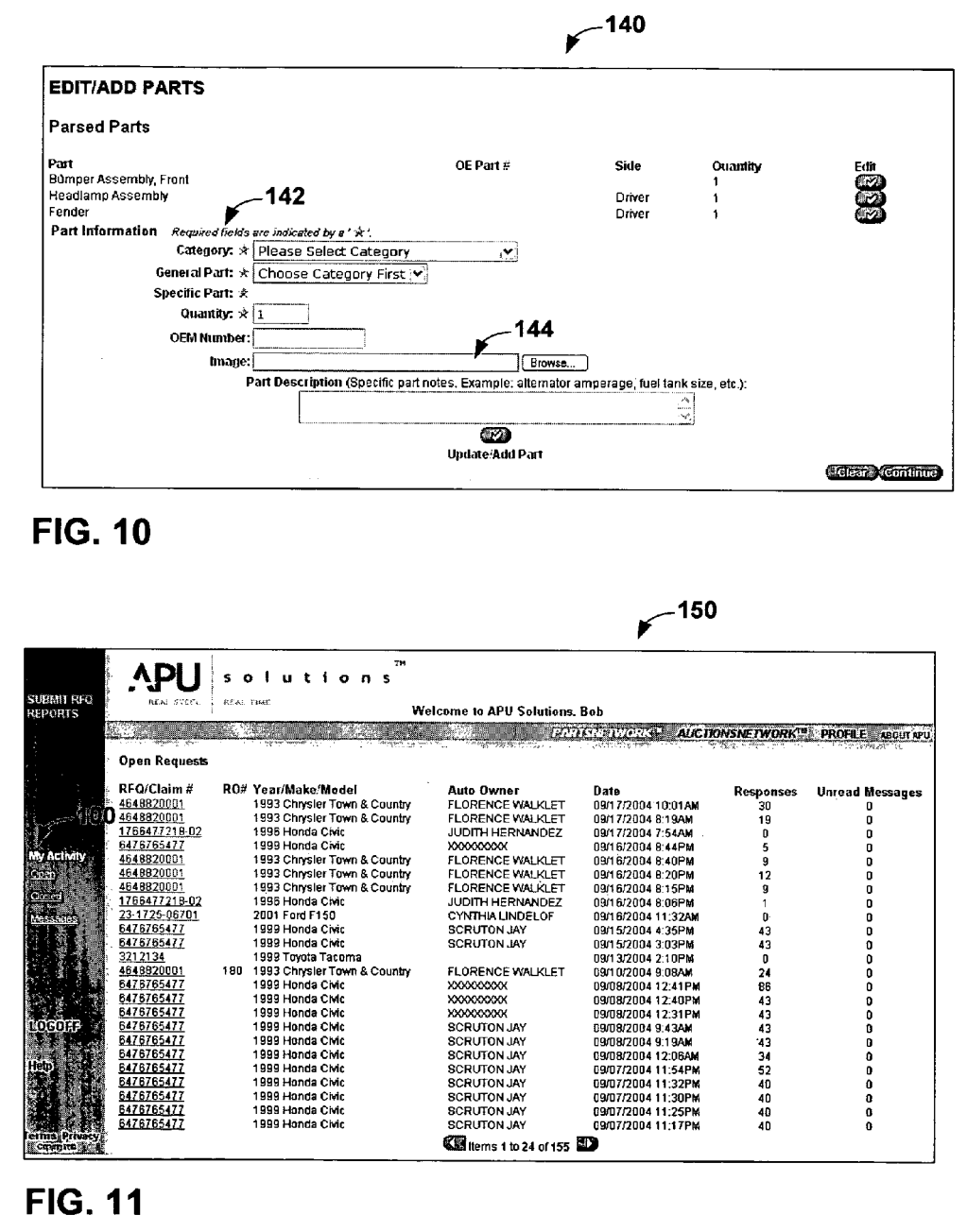

FIG. 10 is a screen illustration of an exemplary user interface 140 for editing parts information in the RFQ. Parts location system 22 may present user interface 140 to a user upon the user selecting the "Edit/Add" button associated with parts information section 136 (see FIG. 9). User interface 140 allows the user to either edit already selected parts or to add new parts. If the user wanted to add an additional part, for example, the user enters information describing the part in part information input section 142. To edit a part, the user selects the check mark beside the part. This causes the part to be removed from the list and placed into the part information section 142. The user can add specific part information and then select "Update/Add Part." As illustrated in FIG. 10, the user may insert an image associated with a part by specifying a location associated with the picture in Image box 144.

FIG. 11 is a screen illustration of an exemplary user interface 150 for viewing open RFQs. Part location system 22 may present user interface 150 to a user upon the user selecting the "Open" link on "My Activity" sidebar menu 92. Alternatively, part location system 22 may automatically direct the user to the user interface 150 once the user has reviewed and submitted the RFQ.

User interface 150 presents the user with all of the RFQs presently open. As described above, an RFQ is open when the RFQ includes one or more quotes that have not been accepted or declined, or when the period for receiving quotes is still open. In addition to a list of all the open RFQs, user interface 150 presents the user with a year, make and model of the vehicle associated with the RFQ, the auto owner associated with the RFQ, the date the RFQ was sent, the number of quotes (i.e., responses) received for parts, and the number of unread messages. In this manner, the user may monitor the quotes received from the suppliers in the network. In one embodiment, part location system 22 periodically refreshes user interface 150, e.g., once every 15 seconds. The user may view the actual quotes by clicking on the claim number for which the user would like to see the quotes.

Figure 12:
FIG. 12 is a screen illustration of an exemplary user interface for viewing the actual quotes of an open RFQ.

FIG. 12 is a screen illustration of an exemplary user interface 160 for viewing the actual quotes of an open RFQ. User interface 160 presents the user with actual quotes from suppliers. In the example illustrated in FIG. 12, parts location system 22 organizes the quotes according to parts; bumper assembly, headlamp assembly, and fender. As described above, however, the quotes may be organized according to supplier, the time at which the quote was received or according to some other variable.

In this case, only a single quote is received for the bumper assembly, and three quotes are shown for both the headlamp assembly and the fender with a link to six more quotes. For each quote, user interface 160 presents the name of the supplier, the price of the quote, the shipping costs, and the cost with markup. In addition, if the supplier attached an image of the part offered, a camera icon with a hyperlink would appear on user interface 160. In the example illustrated in FIG. 12, the supplier name and the quote price are hyperlinks to supplier contact information and comments by the supplier, respectively.

To purchase a product, the user selects a "buy" box adjacent to the one or more parts the user would like to buy and selects a "submit" button. Part location system 22 automatically creates a purchase order for the parts selected and sends the purchase order to the supplier associated with the particular accepted quotes. If the repair facility decides not to accept any of the quotes, the user may select a predefined reason for not purchasing any of the used, recycled or aftermarket parts in the close RFQ drop down menu. Upon selecting the reason in the close RFQ drop down menu, and selecting submit, part location system 22 sends an electronic message to the supplier indicating that their quote was not accepted. Part location system 22 captures all the actions of the repair facility provides it back to the insurance company or other auditing entity for auditing purposes.

User interface 160 provides the repair facility with the ability to return a part that was previously purchased from a supplier. For example, the bumper assembly was previously purchased from Advantage Recycling as indicated by the "purchased" link in the "buy" column. In order to return a product, the user simply selects the "purchased" link, which takes the user to a return user interface.

In addition, user interface 160 provides the repair facility with the ability to attach an R.O. number for searching in reporting, send messages to one or more suppliers regarding the specific quotes, and show quotes from only specific suppliers.

FIG. 13 is a screen illustration of an exemplary user interface 165 for recommending available alternative parts to the repair facility by doing a quick zip code search. An independent appraiser or employee of a repair facility searches for one or more alternative parts across the country by entering a zip code of where the vehicle is to be repaired. The user can enter a zip code from the estimate submission page (see FIG. 6) and part location system 22 will perform a 200-mile radius search. Part location system 22 seeks out the requested parts from the supplier's inventories within the radius and return prices back to the user. The user can then elect to "use on estimate" any prices returned. Once all prices have been selected part location system 22 generates a recommendation report user interface 165 that the appraiser can email or print off to give to the repair facility that will be making the repairs. This recommendation report will include the suppliers name, contact information, and price as well as the approximate mileage the supplier is from the repair facility.

Figure 14:
FIG. 14 is a screen illustration of an exemplary user interface for viewing closed RFQs.

FIG. 14 is a screen illustration of an exemplary user interface 170 for viewing closed RFQs. An RFQ is closed once all parts on a claim have been ordered or closed. Part location system 22 may present user interface 170 to a user upon the user selecting the "Closed" link on "My Activity" sidebar menu 92.

User interface 170 of FIG. 14 presents closed RFQs for the month of September. The user may, however, select a different month from the month drop down menu to view RFQs closed during other months. The user may click on a RFQ number to view the activities that transpired for a particular RFQ in more detail. For example, by clicking on the RFQ number the user may view decline reasons, quotes returned, purchases, returns, and the like.

In addition, user interface 170 presents purchase orders associated with the particular RFQ. In the example illustrated in FIG. 14, user interface 170 presents three purchase orders associated with RFQ #6476765477; a purchase order to Sals' Salvage, a purchase order to Harris Auto Recycling, and a purchase order to Jason's Part Mart. The user may view the purchase orders for the corresponding RFQ in more detail by clicking on the supplier's name. In addition to providing the user a detailed view of the purchase order associated with the supplier, the user may initiate a return to the supplier by clicking on the supplier's name.

FIG. 15 is a screen illustration of an exemplary user interface 180 for returning a part to a supplier. User interface 180 presents a description of the part, the price paid for the part, and the date the part was purchased. User interface includes a return box 182, which the user may select to return a part. Part location system 22 will prompt the user for a reason for the return, and will store this action in the audit log for reporting. Part location system 22 will notify the supplier of the return as well as the reason for the return.

FIG. 16 is a screen illustration of an exemplary user interface 190 that compiles all data regarding a claim and alternative parts requests. User interface 190 allows a repair facility to reveal all alternative parts requests regarding a claim for an insurance audit. Parts User interface 190 includes part description, number of quotes from suppliers with and without the specified part, price as written on the estimate, the difference between the price on the estimate and the purchase price, status (e.g., whether purchased, declined, or returned), and a comment as to decline or return reason.

The purchases can be differentiated by aftermarket and recycled. Purchase prices followed by an A represent purchases from aftermarket venders while purchase prices followed by an R represent purchases from recyclers. In some embodiments, an OEM price may be displayed instead of the price from the original estimate, to show the savings the insurance company received by purchasing alternative parts.

FIG. 17 is a screen illustration of an exemplary user interface 200 for reporting of use of part location system 22 for finding recycled, used or aftermarket parts. User interface 200 reports an overview of all RFQs submitted into the network by a repair facility. The data can be sorted by region, which may be multiple states or single state, city, date, vehicle year, report type, insurance company, state; claim number or R.O. number. The repair facility may report the data back to corporate headquarters or an insurance carrier for auditing. These numbers enable collision repair centers to provide accurate alternative parts utilization data to reduce an insurance company's severity on claims and solicit additional DRP business.

By selecting the search by feature, user interface 200 allows a collision repair center to view activity from suppliers in their network. The primary view yields data from all suppliers in the private network. By selecting User, data from individual supplier can be obtained. This data can be used to determine if a supplier is using the network, number of sales and total expenditures.

FIG. 18 is a screen illustration of an exemplary user interface 210 for suppliers to view RFQs received from repair facilities. Part location system 22 displays user interface 210 to a user upon associating a name and password with a supplier. User interface 210 presents suppliers with a view of RFQs received from multiple repair facilities. In the example illustrated in FIG. 18, the supplier has only received two RFQs, both from Body Shop A.

The supplier may make quotes on one or more parts listed in the RFQ by clicking on the claim number to go to a quoting screen. If the supplier does not have a particular vehicle in stock, the supplier may click a "Close claim" button adjacent to the particular claim and that claim will be removed from the list.

The estimate associated with the RFQ is attached and may be accessed by selecting the "View Estimate" button associated with the particular claim. Parts location system 22 removes any private information from the estimate before attaching the estimate.

All user interfaces presented to a supplier, including user interface 210 include a "My Activity" side menu bar that allows the supplier to view its activities. For example, the "My Activity" side menu bar allows the user to view quotes that are currently out to repair facilities, parts on hold, all sales made, purchase orders from buyers, all declined purchase orders or returned parts, and messages posted to a repair facility or messages received from a repair facility and require a response.

FIGS. 19 and 20 are a screen illustration of exemplary user interfaces for suppliers 18 to provide quotes to part location system 22. As described above, the quotes submitted from suppliers 18 are subsequently presented to the repair facility that sent the RFQ. Particularly, FIG. 19 is a screen illustration of an exemplary user interface 220 for recyclers to provide quotes to part location system 22 and FIG. 20 is a screen illustration of an exemplary user interface 230 for aftermarket vendors to provide quotes to part location system 22. In other words, part location system 22 presents a different user interface for suppliers to submit quotes depending on the type of supplier logged into the system, e.g., recycler or aftermarket vendor.

User interface 220, for example, may be presented to a recycler upon the recycler clicking on the claim number of a previous user interface, such as user interface 210 of FIG. 18. Upon clicking on the claim number, part location system 22 displays to the recycler all parts listed on the RFQ. The recycler enters the quote price for the parts they have in stock. Particularly, the recycler enters the quote price in the quote price box adjacent to the part name. The recycler may additionally enter a clean/repair time, shipping price, attach an image of the part if available and add any comments pertaining to the part (e.g., a delivery time for the part, a condition of the part, and a contact person at the recycler) in the respective boxes. As illustrated in FIG. 19, the quote fields are pre-populated with $0.00, so if the recycler does not have one or more of the parts listed on the RFQ, the quote sent back to the repair facility would be $0.00, thus indicating to the repair facility that the recycler does not have the part in stock.

In addition, the recycler can send a message or question directly to the repair facility via the send message button. This feature is similar to a private message board. Only the two participating parties can view it.

User interface 230 is presented to an aftermarket vendor upon the aftermarket vendor clicking on the claim number of a previous user interface, such as user interface 210 of FIG. 18. Thus, depending on the classification of the supplier as a recycler or an aftermarket vendor, the page presented to the supplier for submitting quotes is different. User interface 230 conforms substantially to user interface 220 of FIG. 19, but instead of entering a quote price and a clean and repair time, aftermarket suppliers submit net and list prices when quoting a repair facility. In addition, the aftermarket supplier selects whether the part is CAPA or MQVP certified.

FIG. 21 is a screen illustration of an exemplary user interface 240 for allowing direct communication between the repair facility and the supplier. Part location system 22 may, for example, present user interface 240 to a supplier upon the supplier clicking on the "Send Message" link on the quoting user interface, e.g., user interface 220 of FIG. 19 or user interface 230 of FIG. 20. Thus, if the supplier has a question for the repair facility, the supplier may elect to send them a message using the message boards system.

FIG. 22 is a screen illustration of an exemplary user interface 250 for presenting a supplier with all currently outstanding quotes. Part location system 22 may present user interface 250 to the supplier upon the supplier selecting the "Quotes Out" link on the "My Activity" side menu bar. Quotes in this screen are listed by claim or RFQ number. In addition to the quote number, user interface 250 presents the user with a make, model and year of a vehicle associated with the RFQ number, an insurance company (if there is one) associated with the claim, the date and time of the quote, and the repair facility to which the quote was given. In addition, part location system 22 generates a purchase report when a purchase has been made on any of their quotes out. The purchase report may be viewed by the user by clicking on the "Purchase Report" link associated with the purchase report. The purchase report will list the parts sold on that claim. The quote may be viewed in more detail by clicking on the claim number.

FIG. 23 is a screen illustration of an exemplary user interface 260 for viewing pending purchase orders. User interface 260 allows the supplier to arrange the pending purchase orders using a number of different criteria, such as by month, country, state, make of vehicle or the like. The supplier must either accept or decline the pending purchase order to proceed with the sale of the part. The supplier may simply click on the "Accept" link to accept the pending purchase order.

Figure 24:
FIG. 24 is a screen illustration of an exemplary user interface for viewing a detail page of a particular claim.

Alternatively, the pending purchase order can be accepted inside the claim by clicking the claim number, verifying the information, and clicking Accept on the detail page. FIG. 24 is a screen illustration of an exemplary user interface 270 for viewing a detail page of a particular claim. User interface 270 presents the user with the date, purchase order number, and purchase order status. In addition, the vendor's name and address, purchasers name and address, vehicle information, insurance information, part description, price and any comments regarding the part are presented to the supplier. On the bottom of the purchase order is a "Decline PO" button and an "Accept PO" button. The user may click on either of those buttons in order to accept or decline the purchase order. If the user decides to decline the purchase order, the supplier must provide a reason for the decline using the decline reason drop down menu. Part location system 22 electronically notifies the repair facility that the purchase order was declined. Part location system 22 may, for example, send an email to the repair facility to notify the repair facility of the decline purchase order.

Figure 25:
FIG. 25 is a screen illustration of an exemplary user interface for viewing purchase orders that the supplier has declined.

FIG. 25 is a screen illustration of an exemplary user interface 280 for viewing purchase orders that the supplier has declined. User interface 280 allows the supplier to arrange the pending purchase orders using a number of different criteria, such as by month, country, state, make of vehicle or the like. The supplier may simply click on the purchase order number to view the declined purchase order in further detail.

FIG. 26 is a screen illustration of an exemplary user interface 290 for viewing sales the supplier has completed. User interface 290 allows the supplier to arrange the pending sales using a number of different criteria, such as by month, country, state, make of vehicle or the like. The supplier may simply click on the purchase order number to view the sale in more detail.

FIG. 27 is a screen illustration of an exemplary user interface 300 for viewing messages that the supplier has declined. User interface 300 allows the supplier to view messages that have either been sent to or received from one of the repair facilities with which the supplier is doing business. The supplier may click on the message subject to view the message in further detail.

FIG. 28 is a screen illustration of an exemplary user interface 320 for viewing messages that the supplier sent or received in further detail. Part location system 22 may present user interface 320 to the supplier upon the supplier clicking the message subject in a previous user interface, such as user interface 320 of FIG. 27. User interface 320 of FIG. 28, for example, is a more detailed view of the communication between the supplier and Body Shop A, i.e., the second message listed in the messages user interface illustrated in FIG. 27.

FIG. 29 is a screen illustration of an exemplary user interface 330 for reporting use of part location system 22. In particular, user interface 330 allows a supplier to view the total number of claims received, the total number of parts listed on the received claims, the total number of quotes provided, the total number of returns, the total sales and an average response time to return a quote. A supplier may sort through the reports based on totals, sales, returns, network sales, network no sales, and the like. In addition, the suppliers can also search by quote number, body shop, year/make/model of vehicle, sales reps, and insurance company.

FIG. 30 is a screen illustration of an exemplary user interface 340 for setting a profile. User interface 340 is a profile setup page for a supplier. User interface 340 presents the supplier with a number of different options for creating filters to control the type of RFQs the supplier receives from repair facilities. In the example user interface illustrated in FIG. 30, part location system 22 allows the supplier to create one or more vehicle filters, part filters, or category filters. If the supplier only sells Chevrolet parts, for example, the supplier sets the vehicle filter so that part location system 22 only sends RFQs that include one or more Chevrolet parts. In another example, a supplier that only sells radiators can set a part filter that filters out all RFQs that do not include a radiator. Thus, if the supplier does not carry certain makes, models, or parts, they can set their filters accordingly.

Figure 31:
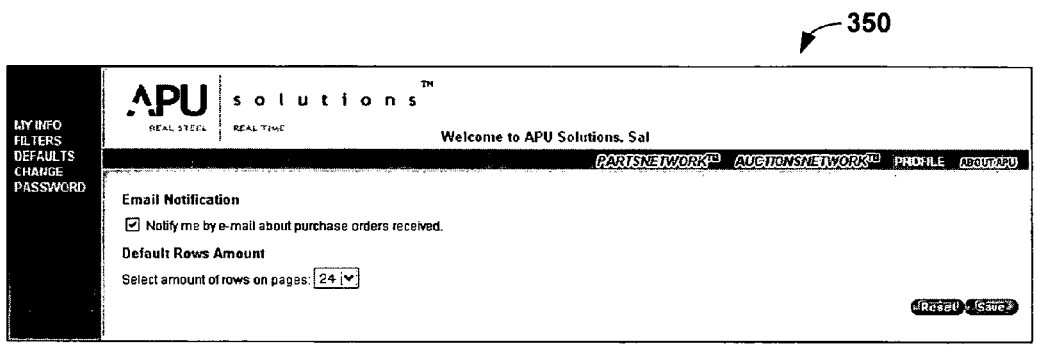
FIG. 31 is a screen illustration of an exemplary user interface for setting the number of leads part location system should show at a time.

FIG. 31 is a screen illustration of an exemplary user interface 350 for setting the number of leads part location system 22 should show at a time. In the example illustrated in FIG. 31, the supplier wants to view 24 leads at a time. Some users, however, may want to view a smaller number of leads at any given time, such as eight leads.

Figure 32:
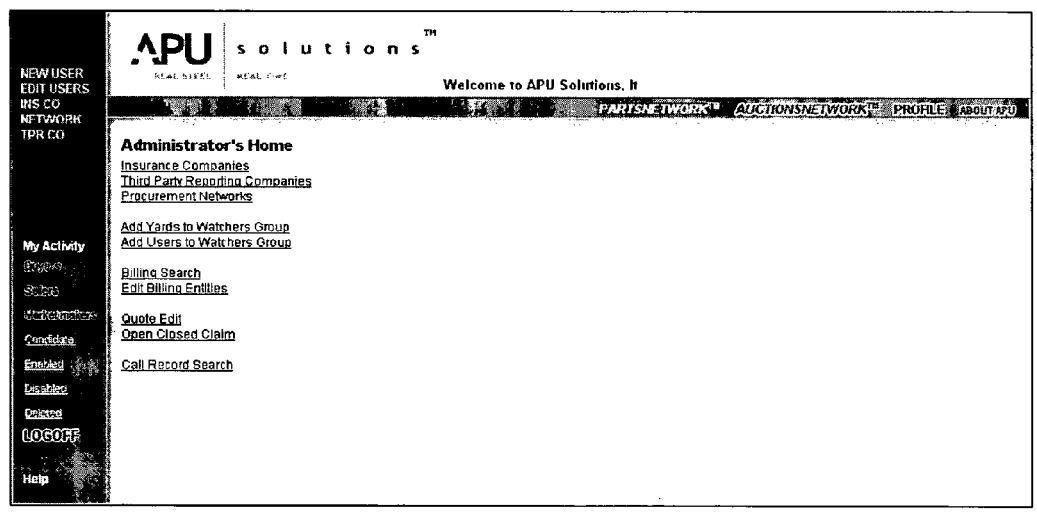

FIG. 32 is a screen illustration of an exemplary user interface 360 for administrative functions. User interface 360 presents a user, such as a repair facility, with a starting point for all the sections for repair facility to maintain groups/networks, companies, users, and registration. The repair facility may, for example, create networks of users, company hierarchies for reporting, add users, change or update user information, and the like. Although described in terms of an administrative user interface for a repair facility, a similar user interface may be presented to other users, such as a supplier or an auditor (e.g., insurance company).

Figures 33, 34:
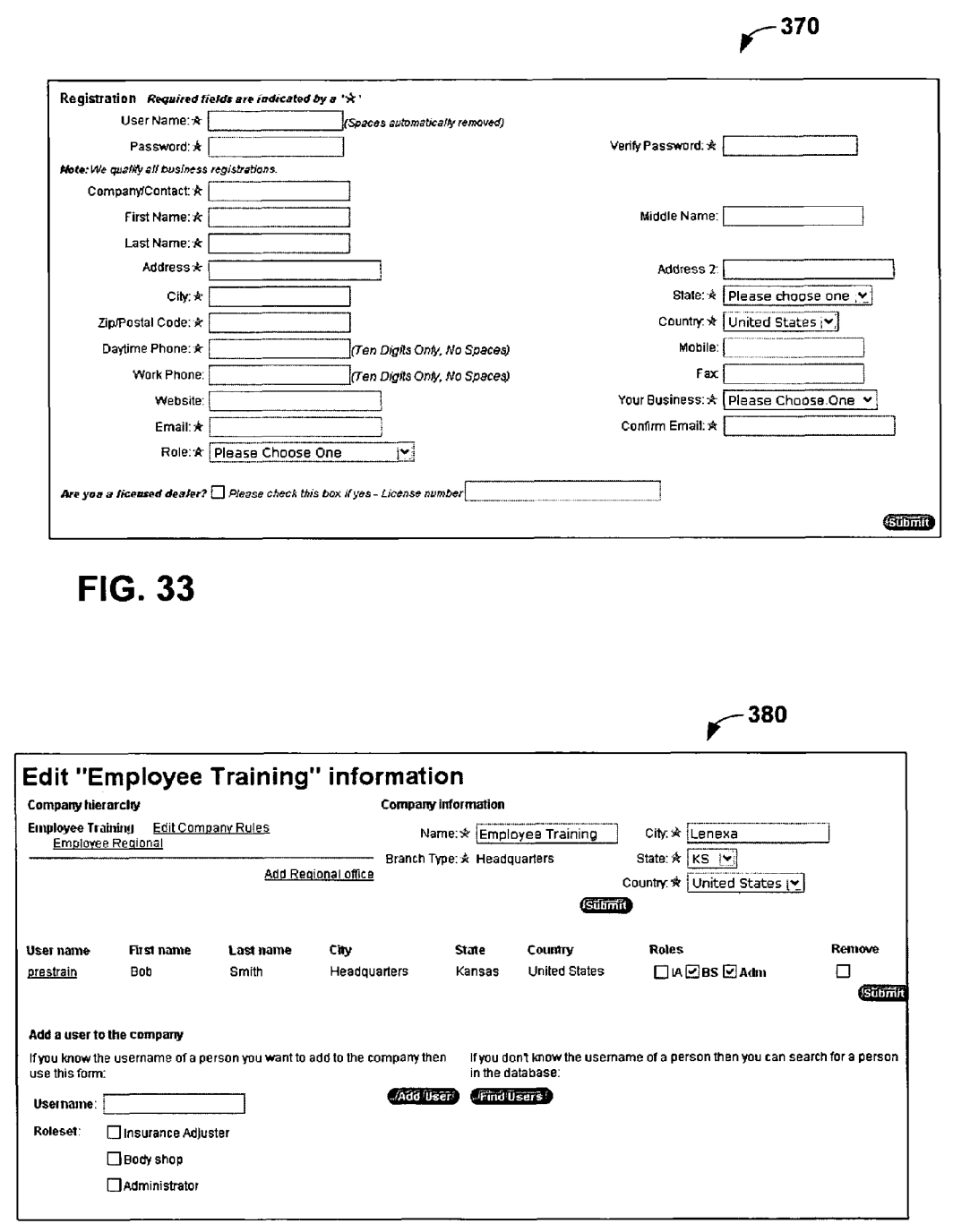

FIG. 33 is a screen illustration of an exemplary user interface 370 for adding a user. As illustrated in FIG. 33, user interface 370 provides a number of boxes to enter information regarding the new user. Boxes with a star are required fields, such as username, password and the like. In one embodiment, all users that register with parts location system 22 are required to have a valid dealer's license.

FIG. 34 is a screen illustration of an exemplary user interface 380 for adding a member to a group. Typically users are already registered at this point, by using the pre-registration checklist and the "Add User" section described above. There are three levels to add users on; regional, local, and user levels. This is the hierarchy of who can report on whom within the company structure.

Figures 35, 36:
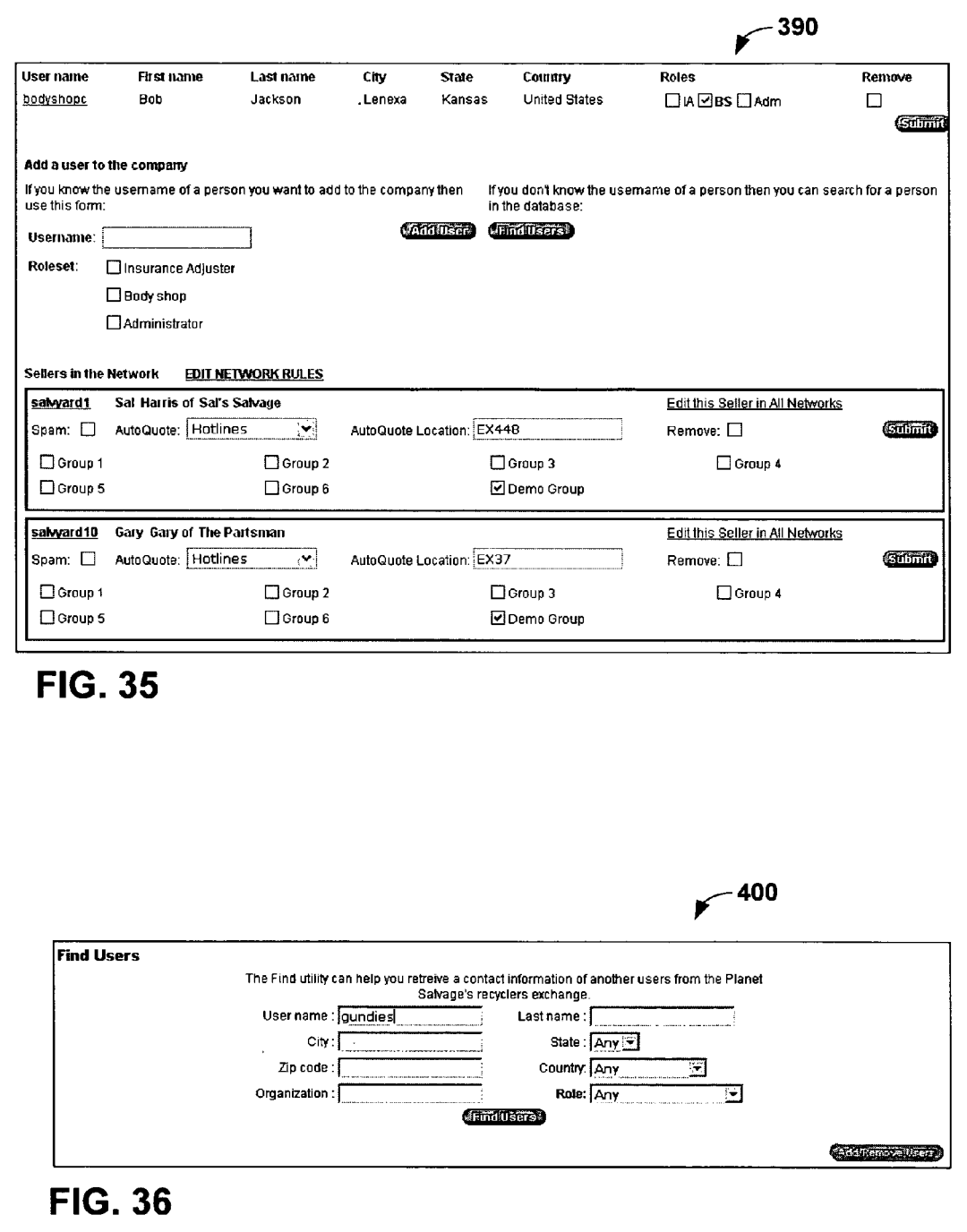

FIG. 35 is a screen illustration of an exemplary user interface 390 adding a member to a group. Once in the group users can view, remove, and add users. Administrators can also select users to receive an electronic notification sent to the suppliers and needs to be checked for every recycler in a network. Each supplier will be in a watch group, which is an area that customer service uses to monitor supplier activity. The supplier's in the network illustrated in FIG. 35 include Sal's Salvage and The Partsman. In addition, there is a location specified for each of the members of the network for finding an inventory for the supplier for autoquoting.

FIG. 36 is a screen illustration of an exemplary user interface 400 for finding a user for a group. The administrator types the username of the member the administrator is looking to add to the group and clicks find user.

Figure 37:
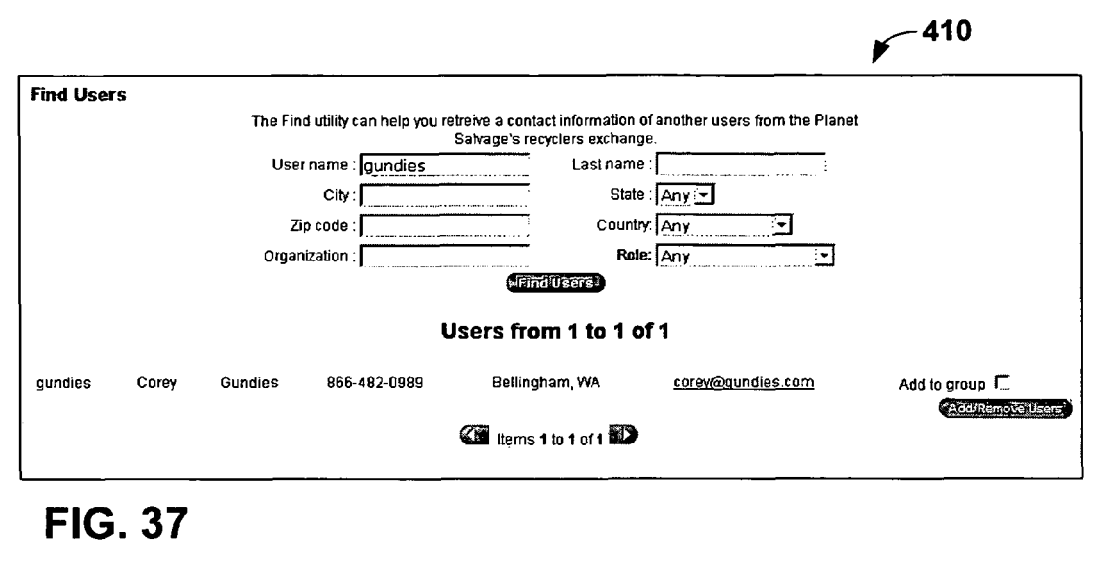

FIG. 37 is a screen illustration of an exemplary user interface 410 for viewing the results of a find as described in FIG. 35. Once the user appears, the administrator can check add to group, then click the "add/remove users" button. If the user is already a member of the group, the administrator will be presented with a remove from group check box.

FIG. 38 is a screen illustration of an exemplary user interface 420 for editing a user already added to part location system 22. The administrator will click on "edit/del users" in the upper left menu bar. The administrator can then enter the username and click "find users". Once the user is revealed the administrator can either delete or disable the user. Disabling the user is generally done by accounting, due to late payment. Deleting a user is done because of cancellation or fraud. By clicking on the username, the administrator can edit any information necessary, such as changing an email address.

Figures 40, 41:
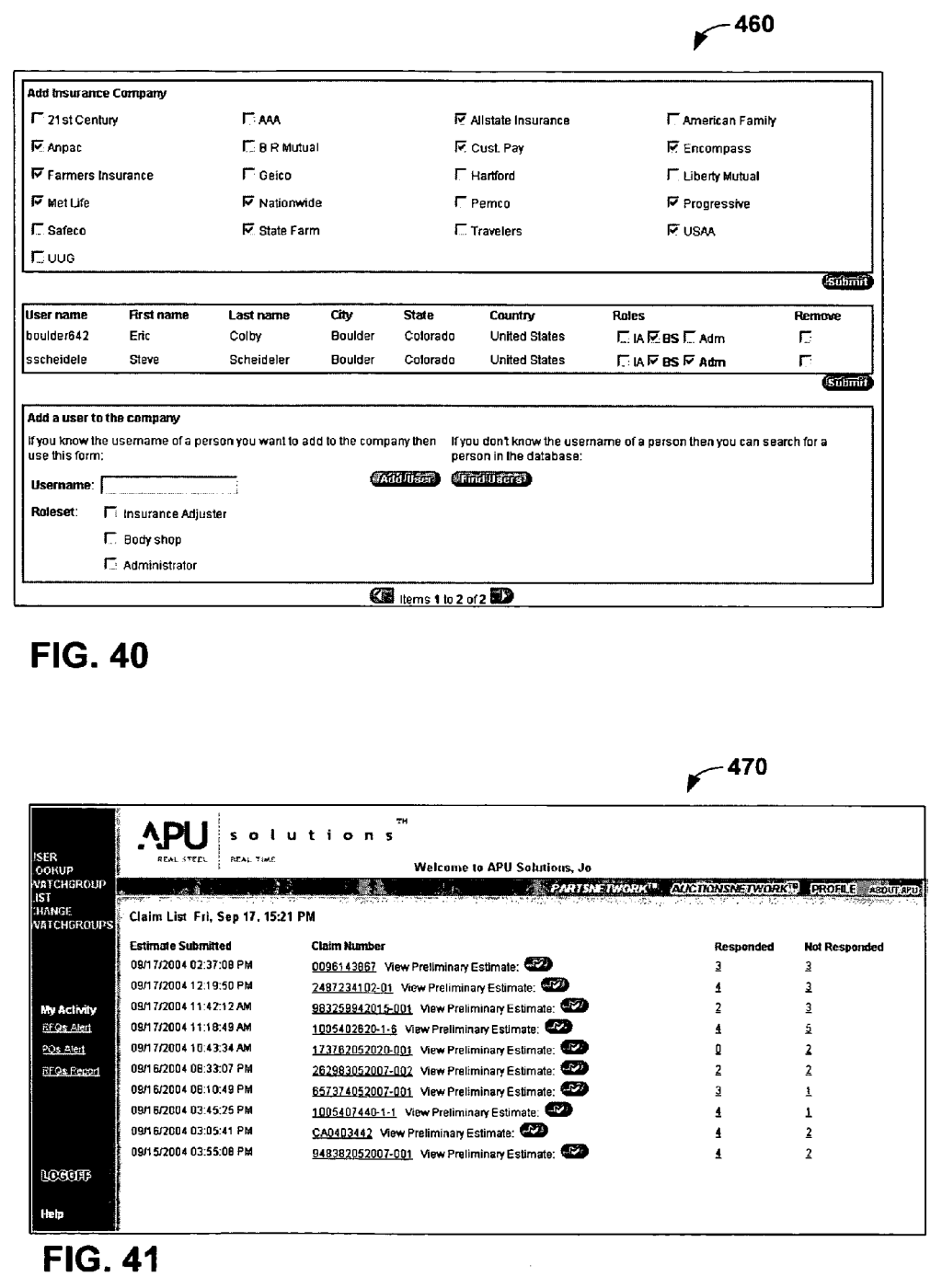

FIGS. 39-41 are screen illustrations of exemplary user interfaces for creating a company. Companies are set up for groups so they can have a reporting hierarchy. All groups must have a company associated with it in order to utilize the reporting/auditing functionality.

The reporting hierarchy may be built like a pyramid. For example, a company may be structured such that it has a headquarters, a regional level, a local level, and a user level. The president of a company may the headquarters and would be able to view all users below him/her. A regional manager may be in the regional level. For example, the manager for Utah, would be able to see all local managers and users in Utah, but not Nevada. A local manager would be able to see all users within his area. For example, the manager for Salt Lake City can view all the users in the area, but not in Provo. Users can only view their own information. For example, body shop manager A can access any claims his shop has entered, but not the shop down the street.

There are two types of company hierarchies that may be established. The first type of company hierarchy is for consolidators. Consolidators consist of one company headquarters with sub companies within them. The second type of company hierarchy is for insurance companies, which will have three different company structures.

When setting up a company for an insurance companies' direct repair program (DRP), a program that award shops that perform or adhere to the insurance companies standards by sending vehicles to be repaired to those locations, we must add three companies to the list. The first company that must be added to the list is the insurance company, which is set-up to add the name of the insurance company to the drop down menu when a repair facility parses an estimate. The second company added is a network company for the actual users in the network. These will be for the repair facilities only. No suppliers are entered into companies. The repair facilities are added into the local level of the network company. There are no users in the headquarters, regional, or user levels. The third company created for an insurance company DRP is the reporting company. The reporting company is for managers who will be reporting on their network. These will be insurance managers that could be in all levels of the company, depending on their position. Thus, establishing the reporting company in part location system 22 allows the insurance company to perform auditing on repair facilities that are part of the network.

FIG. 38 is a screen illustration of an exemplary user interface 440 for setting up a company for a consolidator within part location system 22. A company for a consolidator is one company consisting of its president all the way down to the user level. In the example illustrated in FIG. 38, the consolidator company called "ABRA" has a headquarter authority.

FIG. 39 is a screen illustration of an exemplary user interface 450 for setting up a regional office for ABRA. The regional office may be named based on its location. In the example illustrated in FIG. 39, the regional office is called "Colorado" and the Colorado manager, David Call, would be added as the user in that level. A local level is created in the same manner as the headquarters and regional office FIG. 40 is a screen illustration of an exemplary user interface 460 for setting up users within a local level of a consolidator company, e.g., ABRA. In establishing the local lever, the user must add the repair facilities, which are "users" to the local level. The user may add repair facilities by entering in their user name and checking "body shop" and then selecting "Add User." The user must also select which Insurance companies that repair facility will use in their daily business.

FIG. 41 is a screen illustration of an exemplary user interface 470 for watching a specific group of users to monitor their activity to ensure that they keeping up with their agreed service level agreements. This audit tool allows the user to look up usernames and passwords, specific RFQs, specific groups, specific purchase orders, and most importantly, RFQ and purchase order alerts.

FIG. 42 is a screen illustration of an exemplary user interface 480 for monitoring RFQ alerts. An RFQ alert is to let the administrator know when a lead has not been responded to in a network. For example, in this scenario there are six total suppliers in the network and only three have responded within ten minutes. The other three have not responded. The administrator may be responsible for making sure that these suppliers respond in 10-15 minutes. The administrator can view the non-responsive supplier's information by clicking on the number in the second column. When this link is clicked it produces a pop-up in which the market maker or customer service agent can log all activity associated with communicating with the supplier. All of this data rolls into a management report that lets the manager know call times, comments, and feedback that the market maker has entered.

FIG. 43 is a screen illustration of an exemplary user interface 490 for viewing call times, comments, and feedback for users not keeping up with their agreed level of service.

The above embodiment of a web site in the Internet uses a general purpose computing system for an example of a suitable operating environment in which the invention may be implemented. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, held-held or laptop devices, multiprocessor systems, microprocessor-based systems, programmable consumer electronics, network PCs, minicomputers, mainframe computers, distributed computing environments that include any of the above systems or devices, and the like.

The invention may also be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed in desired in various embodiments.

A processing device attached to a communications network typically includes at least some form of computer readable media. Computer readable media can be any available media that can be accessed by these devices. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by processing devices.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Additionally, the embodiments described herein are implemented as logical operations performed by programmable processing devices. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

While the above embodiments of the present invention describe a system and method for sale of recycled, used, OEM and original manufacturer parts over the Internet, one skilled in the art will recognize that the use of a particular computing architecture for a data processing system are merely example embodiments of the present invention. It is to be understood that other embodiments may be utilized and operational changes may be made without departing from the scope of the present invention as recited in the attached claims.

As such, the foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. The present invention is presently embodied as a method and apparatus for sale of recycled, used, OEM and original manufacturer parts over the Internet.

Various embodiments of the invention have been described. These and other embodiments are within the scope of the following claims.

The invention claimed is:

1. A method for locating parts for repairing an automobile comprising:
receiving, with an online part location system, an electronic estimate from a repair facility over a communication network, wherein the electronic estimate is an electronic copy of an estimate provided to an owner of an automobile that is in the repair facility for repair;
parsing the estimate with the online part location system to extract information that identifies a year and model of the automobile and a list of parts needed by the repair facility to repair the automobile of the owner;
automatically generating a request for quote (RFQ) with the online part location system using the information extracted from the estimate; and electronically sending the RFQ from the online part location system to suppliers via the communication network.

2. The method of claim 1, further comprising remotely presenting a user interface at the repair facility through which the repair facility submits the estimate.

3. The method of claim 2, wherein the user interface presented to the user comprises a window for inputting the estimate, and further comprising receiving the electronic copy of the estimate in the window.

4. The method of claim 1, wherein receiving the estimate from the repair facility comprises receiving an electronic attachment of the estimate from the repair facility.

5. The method of claim 1, wherein receiving the estimate from the repair facility comprises extracting an Estimating Management Standard (EMS) file from an estimating platform used by the repair facility.

6. The method of claim 1, wherein parsing the estimate further comprises parsing the estimate to extract vehicle information in addition to the list of parts.

7. The method of claim 1, further comprising, with the part location system, automatically filtering information of a personal nature of the owner from the estimate when generating the RFQ such that no private information about the owner is included in the RFQ.

8. The method of claim 1, further comprising filtering from the list of parts those parts identified to be purchased new.

9. The method of claim 1, further comprising:
the part location system automatically identifying combinations of parts from the list of parts from which an aggregate part can be formed; and
the part location system including the aggregate part in the RFQ instead of the combination of parts extracted from the estimate.

10. The method of claim 1, further comprising:
receiving an image of a part from the repair facility over the communication network; and
the part location system embedding the image in the RFQ.

11. The method of claim 1, further comprising:
the part location system selecting a subset of suppliers to which to send the RFQ; and
sending the RFQ from the part location system to the selected subset of suppliers.

12. The method of claim 11, wherein selecting the subset of suppliers to which to send the RFQ comprises the part location system selecting suppliers identified by the repair facility.

13. The method of claim 11,
wherein parsing the estimate with the online part location system to extract information comprises the online part location system parsing the estimate to extract claim information representing an insurance claim and identifying an insurance company for the owner of the car that is associated with the repair;
wherein selecting suppliers to which to send the RFQ comprises the online part location system selecting suppliers identified by the insurance company as approved suppliers with which the insurance companies does business.

14. The method of claim 11, wherein selecting suppliers to which to send the RFQ comprises the online part location system storing and applying a set of profiles to select the suppliers to which to send the RFQ based on one of a geographic location and a type of part carried by the suppliers.

15. The method of claim 1, further comprising:
receiving, with the online part location system, an electronic quote from at least one of the suppliers for one or more parts identified in the RFQ; and presenting, with the online part location system, the quote to the repair facility associated with the RFQ.

16. The method of claim 15, wherein receiving a quote from one of the suppliers comprises receiving a quote directly from an employee of one of the suppliers.

17. The method of claim 15, wherein receiving a quote form one of the suppliers comprises:
the online part location system electronically accessing an inventory management system associated with one of the suppliers; and
the online part location system electronically identifying a current quote price from the inventory management system for one or more parts identified in the RFQ.

18. The method of claim 15, further comprising:
receiving quotes from a plurality of suppliers;
arranging the quotes from the suppliers according to part; and
presenting the quotes to the repair facility.

19. The method of claim 15, further comprising:
receiving quotes from a plurality of suppliers;
arranging the quotes from the suppliers according to suppliers; and
presenting the quotes to the repair facility.

20. The method of claim 15, further comprising:
receiving input from the repair facility indicating that the repair facility would like to accept the quote;
automatically generating a purchase order for the part associated with the accepted quote; and
sending the purchase order to the one of the suppliers that submitted the quote.

21. The method of claim 20, further comprising:
receiving quotes for multiple parts from one of the suppliers;
receiving input from the repair facility indicating that the repair facility accepts more than one of the quotes from the one of the suppliers; and
automatically generating a purchase order for all the parts associated with the accepted quotes from the one of the suppliers.

22. The method of claim 20, further comprising maintaining an audit log that tracks the generated RFQ, the resulting quotes, and the quotes accepted by the repair facility.

23. The method of claim 22, further comprising providing a summary of the audit log to an auditor.

24. The method of claim 22, further comprising:
receiving audit criteria from an auditor;
retrieving information from the audit log based on the audit criteria; and
presenting the auditor with the information retrieved from the audit log.

25. The method of claim 24, wherein the audit criteria includes at least one of a city, shop name, parts manager, date, and time.

26. The method of claim 22, further comprising presenting the auditor with information regarding RFQs currently open.

27. A device comprising:
a communication interface to couple the device to a computer network; and
a control unit comprising:
a processor;
a parsing engine, executing on the processor, that receives an estimate from a remote repair facility over the computer network and parses the estimate to extract information that identifies a list of parts needed by the remote repair facility, wherein the electronic estimate is an electronic copy of an estimate provided to an owner of an automobile that is in the repair facility for repair; and a request for quote (RFQ) manager, executing on the processor, that automatically generates an electronic RFQ using the information extracted from the estimate and sends the RFQ to suppliers via the computer network.

28. The device of claim 27, wherein the control unit further comprises a user interface module to present a user interface to the remote repair facility to allow the remote repair facility to input the estimate.

29. The device of claim 28, wherein the remote repair facility inputs a copy of the estimate in a window of the user interface.

30. The device of claim 28, wherein the parsing engine receives an electronic attachment of the estimate from the remote repair facility via the user interface.

31. The device of claim 27, wherein the parsing engine receives an Estimating Management Standard (EMS) file from an estimating platform used by the repair facility.

32. The device of claim 27, wherein the parsing engine parses the estimate to extract vehicle information in addition to the list of parts.

33. The device of claim 27, wherein the parsing engine filters information of a personal nature from the estimate.

34. The device of claim 27, wherein the parsing engine filters from the list of parts those parts identified to be purchased new.

35. The device of claim 27, wherein the parsing engine identifies combinations of parts from the list of parts that form an aggregate part.

36. The device of claim 27, wherein the RFQ management module selects a subset of suppliers to which to send the RFQ and sends the RFQ to the selected subset of suppliers.

37. The device of claim 36, wherein the RFQ management module selects suppliers identified by the repair facility.

38. The device of claim 36, wherein the RFQ management module selects suppliers identified by an insurance company.

39. The device of claim 36, wherein the RFQ management module selects suppliers based on one of a geographic location and a type of part carried by the suppliers.

40. The device of claim 27, wherein the RFQ management module receives a quote from at least one of the suppliers for one or more parts identified in the RFQ and presents the quote to the repair facility associated with the RFQ.

41. The device of claim 40, wherein the RFQ management module receives the quote directly from an employee of one of the suppliers.

42. The device of claim 40, wherein the RFQ management module accesses an inventory associated with one of the suppliers and identifies a quote price from the inventory.

43. The device of claim 40, wherein the quote comprises a first quote from a first supplier, and wherein the RFQ management module receives quotes from multiples suppliers, arranges the quotes from the suppliers according to part and presents the quotes to the repair facility.

44. The device of claim 40, wherein the quote comprises a first quote from a first supplier, and wherein the RFQ management module receives quotes from multiple other suppliers, arranges the quotes from the suppliers according to suppliers and presents the quotes to the repair facility.

45. The device of claim 40, wherein the RFQ management module receives input from the repair facility indicating that the repair facility would like to accept the quote, automatically generates a purchase order for the part corresponding to the accepted quote and sends the purchase order to the one of the suppliers that submitted the quote.

46. The device of claim 45, wherein the quote comprises a first quote from a supplier, and further wherein the RFQ management module receives a second quote from the supplier, receives input from the repair facility indicating that the repair facility accepts both the quotes from the supplier, and automatically generates a purchase order for all the parts associated with the accepted quotes from the supplier.

47. The device of claim 45, wherein the control unit maintains an audit log that tracks the generated RFQ, the resulting quotes, and the quotes accepted by the repair facility.

48. The device of claim 47, wherein the control unit provides a summary of the audit log to an auditor.

49. The device of claim 47, wherein the control unit receives audit criteria from an auditor, retrieves information from the audit log based on the audit criteria and presents the auditor with the information retrieved from the audit log.

50. The device of claim 49, wherein the audit criteria includes at least one of a city, shop name, parts manager, date, and time.

51. A system comprising:
a repair facility coupled to a computer network;
a plurality of supplier computing systems coupled to the computer network; and
a part location device coupled to the computer network, wherein the part location device comprises a control unit that comprises:
  a parsing engine that receives an estimate from a remote repair facility over the computer network and parses the estimate to extract information that identifies a list of parts needed by the remote repair facility, and
  a request for quote (RFQ) management module executed by the control unit to automatically generate an RFQ using the information extracted from the estimate and sends the RFQ to the supplier computing systems via the computer network.

52. The system of claim 51, wherein the control unit further comprises a user interface module to present a user interface to the repair facility to allow the repair facility to input the estimate.

53. The system of claim 52, wherein the repair facility inputs a copy of the estimate in a window of the user interface.

54. The system of claim 52, wherein the parsing engine receives an electronic attachment of the estimate from the repair facility via the user interface.

55. The system of claim 51, wherein the parsing engine receives an Estimating Management Standard (EMS) file from an estimating platform used by the repair facility.

56. The system of claim 51, wherein the parsing engine parses the estimate to extract vehicle information in addition to the list of parts.

57. The system of claim 51, wherein the parsing engine filters information of a personal nature from the estimate.

58. The system of claim 51, wherein the parsing engine filters from the list of parts those parts identified to be purchased new.

59. The system of claim 51, wherein the parsing engine identifies combinations of parts from the list of parts that form an aggregate part.

60. The system of claim 51, wherein the RFQ management module selects a subset of the supplier computing systems to which to send the RFQ and sends the RFQ to the selected subset of supplier computing systems.

61. The system of claim 60, wherein the RFQ management module selects the subset of supplier computing systems that are associated with suppliers identified by one of the repair facility and an insurance company.

62. The system of claim 60, wherein the RFQ management module selects the subset of supplier computing systems based on one of a geographic location and a type of part carried by each of the suppliers.

63. The system of claim 51, wherein the RFQ management module receives a quote from at least one of the supplier computing systems for one or more parts identified in the RFQ and presents the quote to the repair facility associated with the RFQ.

64. The system of claim 63, wherein the RFQ management module receives the quote directly from an employee of one of the suppliers by interaction with a corresponding one of the supplier computing systems.

65. The system of claim 63, wherein the RFQ management module accesses an inventory associated with one of the supplier computing systems and identifies a quote price from the inventory.

66. The system of claim 63, wherein the quote comprises a first quote from a first one of the supplier computing systems, and wherein the RFQ management module receives quotes from multiple other supplier computing systems, arranges the quotes from the supplier computing systems according to part and presents the quotes to the repair facility.

67. The system of claim 63, wherein the quote comprises a first quote from a first one of the supplier computing systems, and wherein the RFQ management module receives quotes from multiple other supplier computing systems, arranges the quotes from the supplier computing systems according to suppliers and presents the quotes to the repair facility.

68. The system of claim 63, wherein the RFQ management module receives input from the repair facility indicating that the repair facility would like to accept the quote, automatically generates a purchase order for the part associated with the accepted quote and sends the purchase order to the one of the supplier computing systems that submitted the quote.

69. The system of claim 68, wherein the quote comprises a first quote from the supplier computing system, and further wherein the RFQ management module receives a second quote from the supplier computing system, receives input from the repair facility indicating that the repair facility accepts both the quotes from the supplier computing system, and automatically generates a purchase order for all the parts associated with the accepted quotes from the supplier computing system.

70. The system of claim 68, wherein the control unit maintains an audit log that tracks the generated RFQ, the resulting quotes, and the quotes accepted by the repair facility.

71. The system of claim 70, wherein the control unit provides a summary of the audit log to an auditor.

72. The system of claim 70, wherein the control unit receives audit criteria from an auditor, retrieves information from the audit log based on the audit criteria and presents the auditor with the information retrieved from the audit log.

73. The system of claim 72, wherein the audit criteria includes at least one of a city, shop name, parts manager, date, and time.

74. The system of claim 51, wherein the computer network comprises at least one of a Local Area Networks (LAN), Wide Area Network (WAN), and Wireless LAN.

75. The system of claim 51, wherein the suppliers comprise at least one or recyclers, used part dealers, and aftermarket vendors.

76. The system of claim 51, wherein the repair facility comprises a first repair facility, and further comprising a second repair facility.

77. A non-transitory computer-readable storage medium, comprising instructions that cause a programmable processor to:
receive an estimate from a repair facility over a communication network;
parse the estimate to extract information that identifies a list of parts needed by the repair facility;
automatically generate a request for quote (REQ) using the information extracted from the estimate; and
send the RFQ to suppliers via the communication network.

78. The non-transitory computer-readable storage medium of claim 77, wherein instructions to cause the processor to parse the estimate include instruction to parse to extract vehicle information in addition to the list of parts.

79. The non-transitory computer-readable storage medium of claim 77, further comprising instructions to cause the processor to filter information of a personal nature from the estimate.

80. The non-transitory computer-readable storage medium of claim 77, further comprising instructions to cause the processor to filter from the list of parts those parts identified to be purchased new.

81. The non-transitory, computer-readable storage medium of claim 77, further comprising instructions to cause the processor to
identify combinations of parts from the list of parts that form an aggregate part; and
include the aggregate part in the RFQ.

82. The non-transitory computer-readable storage medium of claim 77, further comprising instructions to cause the processor to:
select a subset of suppliers to which to send the RFQ; and
send the RFQ to the selected subset of suppliers.

83. The non-transitory computer-readable storage medium of claim 82, wherein instructions to cause the processor to select the subset of suppliers include instruction to select suppliers identified by one of the repair facility and an insurance company.

84. The non-transitory computer-readable storage medium of claim 82, wherein instructions to cause the processor to select the subset of suppliers include instruction to select suppliers based on one of a geographic location and a type of part carried by the suppliers.

85. The non-transitory computer-readable storage medium of claim 77, further comprising instructions to cause the processor to:
receive a quote from at least one of the suppliers for one or more parts identified in the RFQ; and
present the quote to the repair facility associated with the RFQ.

86. The non-transitory computer-readable storage medium of claim 85, wherein instructions to cause the processor to receive a quote from one of the suppliers include instruction to receive a quote directly from an employee of one of the suppliers.

87. The non-transitory computer-readable storage medium of claim 85, further comprising instructions to cause the processor to;
receive quotes from a plurality of suppliers;
arrange the quotes from the suppliers according to one of part and supplier; and
present the quotes to the repair facility.

88. The non-transitory computer-readable storage medium of claim 85, further comprising instructions to cause the processor to:
receive input from the repair facility indicating that the repair facility would like to accept the quote;

automatically generate a purchase order for the part associated with the accepted quote; and
send the purchase order to the one of the suppliers that submitted the quote.

89. The non-transitory computer-readable storage medium of claim 88, further comprising instructions to cause the processor to:
receive quotes for multiple parts from one of the suppliers;
receive input from the repair facility indicating that the repair facility accepts more than one of the quotes from the one of the suppliers; and
automatically generate a purchase order for all the parts associated with the accepted quotes from the one of the suppliers.

90. The non-transitory computer-readable storage medium of claim 88, further comprising instructions to cause the processor to maintain an audit log that tracks the generated RFQ, the resulting quotes, and the quotes accepted by the repair facility.

91. The non-transitory computer-readable storage medium of claim 90, further comprising instructions to cause the processor to provide a summary of the audit log to an auditor.

92. The non-transitory computer-readable storage medium of claim 90, further comprising instructions to cause the processor to:
receiving audit criteria from an auditor;
retrieving information from the audit log based on the audit criteria; and
presenting the auditor with the information retrieved from the audit log.

93. A method comprising:
receiving, with an online part location system, an estimate from a repair facility;
parsing the estimate with the online part location system to extract information that identifies a list of parts needed by the repair facility;
filtering, with the online part location system, at least a portion of the parts that do not meet a set of rules provided by an insurance company; and
automatically generating a request for quote (RFQ) with the online part location system using the information extracted from the estimate.

94. The method of claim 93, wherein filtering the parts that do not meet a set of rules provided by the insurance company comprises filtering the parts that the insurance company requires to be purchased new.

95. A method comprising:
receiving, with the online part location system, an estimate from a repair facility;
parsing the estimate to extract information that identifies a list of parts needed by the repair facility;
identifying, with the online part location system, combinations of parts from the list of parts that form an aggregate part; and
automatically generating a request for quote (RFQ) with the online part location system using the information extracted from the estimate and the identified aggregate parts.

96. The method of claim 1, further comprising:
storing a plurality of profiles for a plurality of different repair facilities, where each of the profiles defines a virtual marketplace by identifies a set of the suppliers with which the respective repair facility will conduct business;
selecting one of the profiles based on the repair facility from which the estimate was received;
selecting a subset of suppliers to which to send the RFQ based on the selected profile; and
sending the RFQ from the part location system to the selected subset of suppliers.

97. The method of claim 1, further comprising automatically filtering from the list of parts, with the part location system, those parts identified by the part location system as parts not carried by recyclers as road hazard parts including brakes.

98. The method of claim 1, further comprising remotely presenting a user interface at the repair facility through which the repair facility submits the electronic estimate,
wherein the user interface includes an input option configured to allow the user to identify an estimate platform by which the submitted estimate was electronically created,
wherein the input option is configured to allow the user to select between a plurality of different electronic estimate platforms supported by the part location system, and
wherein parsing the estimate comprises extracting the information from the estimate in accordance with a format determined from the electronic estimate platform identified by the user as used to create the estimate being submitted.

* * * * *

UNITED STATES PATENT AND TRADEMARK OFFICE
CERTIFICATE OF CORRECTION

| | |
|---|---|
| PATENT NO. | : 7,835,945 B2 |
| APPLICATION NO. | : 10/979777 |
| DATED | : November 16, 2010 |
| INVENTOR(S) | : Jay F. Scruton, Orson P. Davis and Deathe Davis |

It is certified that error appears in the above-identified patent and that said Letters Patent is hereby corrected as shown below:

In the Specification

Column 12, line 21, "claims" should read --Claims--

In the Claims

Column 27, line 63, Claim 75, "or" should read --of--

Signed and Sealed this
Nineteenth Day of November, 2013

Teresa Stanek Rea
*Deputy Director of the United States Patent and Trademark Office*